United States Patent
Mizoguchi

(10) Patent No.: US 9,493,144 B2
(45) Date of Patent: Nov. 15, 2016

(54) VEHICLE BRAKING APPARATUS

(75) Inventor: Yoji Mizoguchi, Sunto-gun (JP)

(73) Assignee: TOYOTA JIDOSHA KABUSHIKA KAISHA, Toyota-Shi (JP)

( * ) Notice: Subject to any disclaimer, the term of this patent is extended or adjusted under 35 U.S.C. 154(b) by 0 days.

(21) Appl. No.: 14/365,320

(22) PCT Filed: Dec. 16, 2011

(86) PCT No.: PCT/JP2011/079254
§ 371 (c)(1),
(2), (4) Date: Jun. 13, 2014

(87) PCT Pub. No.: WO2013/088581
PCT Pub. Date: Jun. 20, 2013

(65) Prior Publication Data
US 2014/0339889 A1     Nov. 20, 2014

(51) Int. Cl.
| | |
|---|---|
| *B60T 7/22* | (2006.01) |
| *B60T 11/28* | (2006.01) |
| *B60T 11/10* | (2006.01) |
| *B60T 13/68* | (2006.01) |
| *B60T 8/1766* | (2006.01) |
| *B60T 8/26* | (2006.01) |
| *B60T 8/32* | (2006.01) |

(52) U.S. Cl.
CPC ............... *B60T 7/22* (2013.01); *B60T 8/1766* (2013.01); *B60T 8/268* (2013.01); *B60T 11/101* (2013.01); *B60T 11/28* (2013.01); *B60T 13/686* (2013.01); *B60T 8/3275* (2013.01); *B60T 2201/022* (2013.01)

(58) Field of Classification Search
CPC ................... B60T 11/101; B60T 11/28; B60T 13/686; B60T 7/22; B60T 8/1766; B60T 8/268
USPC .......................... 303/9.62, 193, 191; 701/70
See application file for complete search history.

(56) References Cited

U.S. PATENT DOCUMENTS

| | | | | |
|---|---|---|---|---|
| 4,852,950 A | * | 8/1989 | Murakami | .......... B60T 8/17616 180/197 |
| 6,345,869 B1 | * | 2/2002 | Matsuo | ................... B60T 8/268 303/113.1 |

(Continued)

FOREIGN PATENT DOCUMENTS

| | | |
|---|---|---|
| JP | 05-240075 A | 9/1993 |
| JP | 11-091525 | 4/1999 |

(Continued)

*Primary Examiner* — Robert A Siconolfi
*Assistant Examiner* — San Aung
(74) *Attorney, Agent, or Firm* — Andrews Kurth Kenyon LLP

(57) ABSTRACT

A vehicle braking apparatus varies a relationship of a pressure increase characteristic of rear-wheel brake oil pressure with respect to a pressure increase characteristic of front-wheel brake oil pressure according to a determination result of a likelihood of a collision with an obstacle. Preferably, when the likelihood of a collision with an obstacle is lower than a predetermined level, the relationship of the pressure increase characteristic of the rear-wheel brake oil pressure with respect to the pressure increase characteristic of the front-wheel brake oil pressure is caused to be a relationship in which a wheel cylinder pressure of the rear wheel increases not earlier than wheel cylinder pressure of the front wheel.

6 Claims, 11 Drawing Sheets

(56) References Cited

U.S. PATENT DOCUMENTS

| | | | |
|---|---|---|---|
| 6,378,961 B1 | 4/2002 | Hara et al. | |
| 2001/0013722 A1* | 8/2001 | Udaka | B60T 8/268 |
| | | | 303/28 |
| 2002/0000750 A1* | 1/2002 | Harris | B60T 7/042 |
| | | | 303/20 |
| 2002/0008426 A1* | 1/2002 | Isono | B60T 8/367 |
| | | | 303/115.4 |
| 2008/0136251 A1* | 6/2008 | Lee | B60T 8/4872 |
| | | | 303/113.2 |
| 2011/0035129 A1* | 2/2011 | Yasui | B60T 8/17558 |
| | | | 701/70 |

FOREIGN PATENT DOCUMENTS

| | | |
|---|---|---|
| JP | 2000-108860 A | 4/2000 |
| JP | 2000-118368 A | 4/2000 |
| JP | 2003-165428 A | 6/2003 |
| JP | 2004-155303 A | 6/2004 |
| JP | 2004-196065 A | 7/2004 |
| JP | 2006-103547 A | 4/2006 |

* cited by examiner

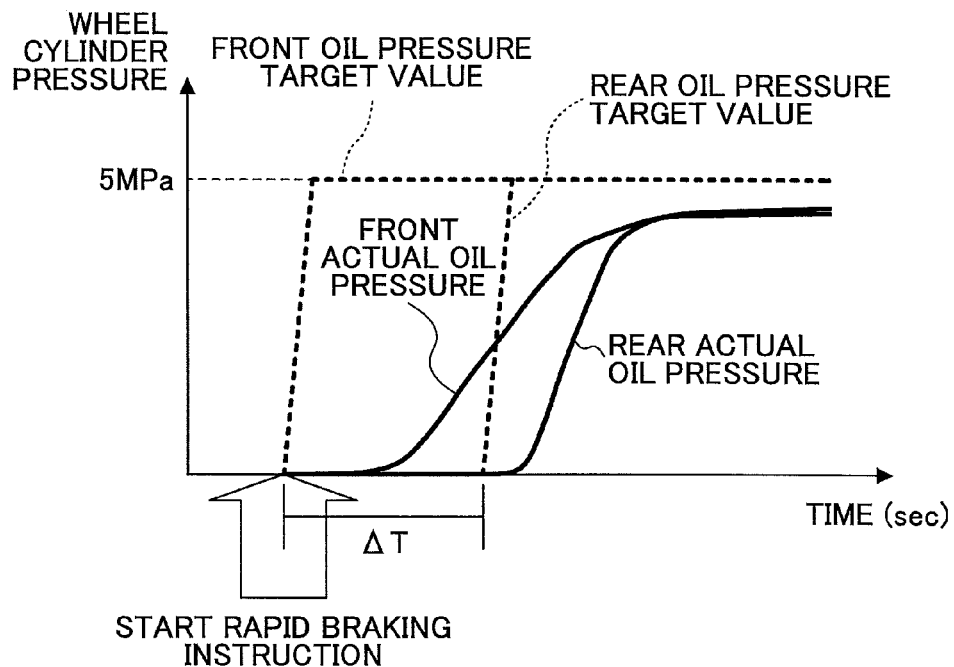
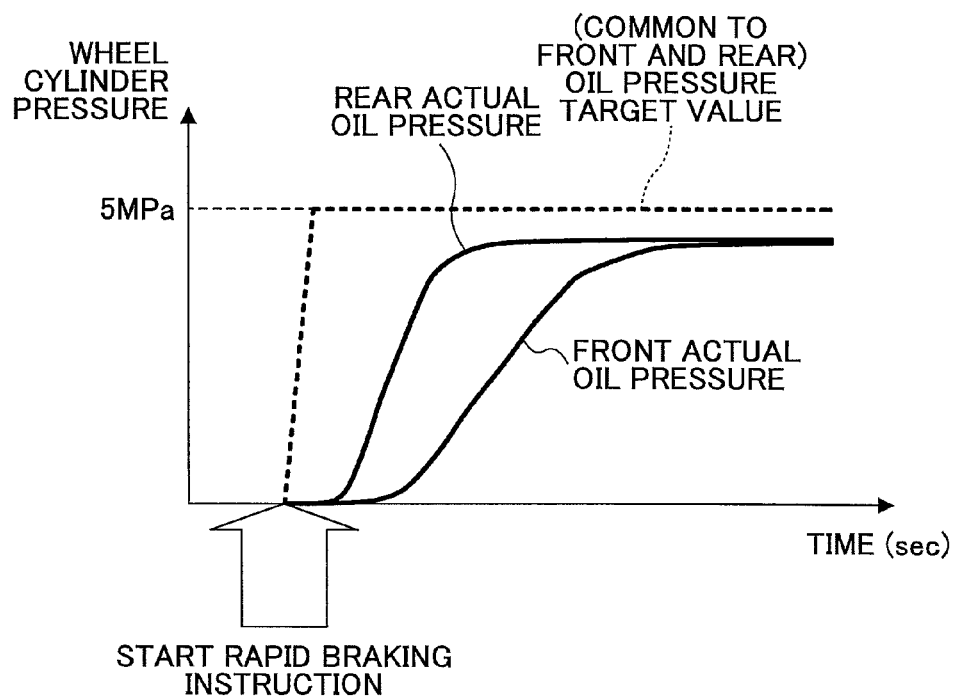

FIG.12
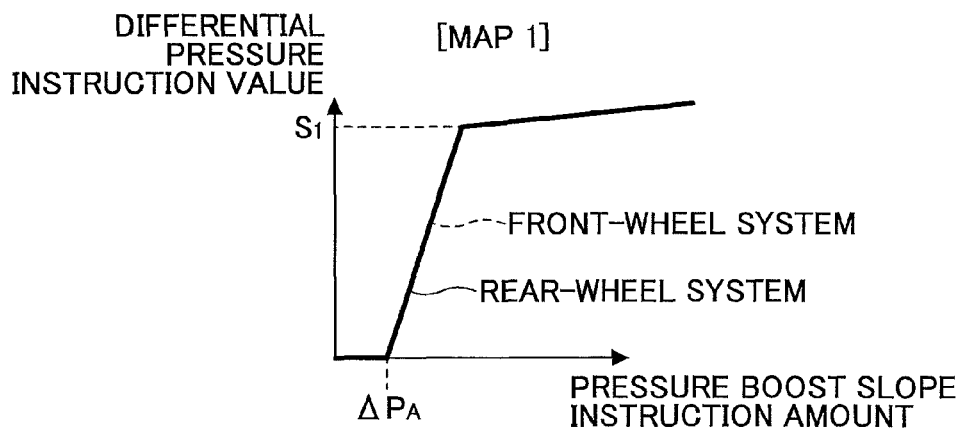
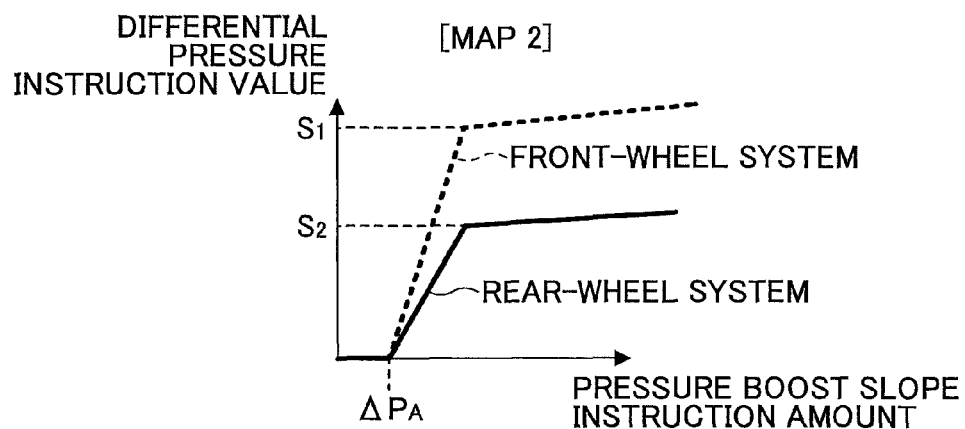
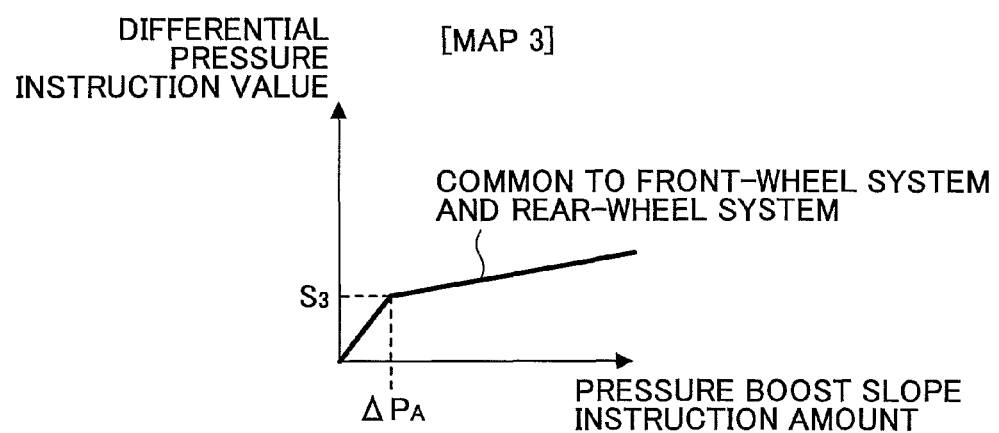

— VEHICLE BRAKING APPARATUS

CROSS-REFERENCE TO RELATED APPLICATIONS

This is a national phase application based on the PCT International Patent Application No. PCT/JP2011/079254 filed Dec. 16, 2011, the entire contents of which are incorporated herein by reference.

TECHNICAL FIELD

The present invention relates to a vehicle braking apparatus.

BACKGROUND ART

In the prior art, a vehicle braking apparatus is known (for example, see Patent Reference No. 1). In the vehicle braking apparatus, when it is determined that there is a contact likelihood of a vehicle contacting an obstacle, and also, a voluntary braking operation of a driver is detected, braking force automatically increases, and the braking operation of the driver is assisted. At this time, the increasing amount of the braking force is caused to be greater as the contact likelihood is higher.

PRIOR ART REFERENCE

Patent Reference

Patent Reference No. 1: Japanese Laid-Open Patent Application No. 2000-118368

SUMMARY OF THE INVENTION

Problem to be Solved by the Invention

However, in the configuration of the Patent Reference No. 1, there is room for an improvement of running stability at a time of vehicle braking.

Therefore, the present invention has an objective to provide a vehicle barking apparatus by which it is possible to implement optimum braking characteristics according to a likelihood of a collision with an obstacle.

Means for Solving the Problem

According to one aspect of the present invention, a vehicle braking apparatus is provided which is characterized by varying a relationship of a pressure increase characteristic of rear-wheel brake oil pressure with respect to a pressure increase characteristic of front-wheel brake oil pressure according to a determination result of a likelihood of a collision with an obstacle.

Advantageous Effect of the Invention

According to the present invention, it is possible to obtain a vehicle braking apparatus by which it is possible to implement optimum braking characteristics according to a likelihood of a collision with an obstacle.

BRIEF DESCRIPTION OF DRAWINGS

FIG. 6 shows one example of time series (target control value patterns) of target control values that are set for a front wheel system and a rear wheel system in a case of rear-wheel pressure-boost-inhibiting-type four-wheel automatic braking;

FIG. 7 shows one example of time series (target control value patterns) of target control values that are set for the front wheel system and the rear wheel system in a case of non-inhibiting-type four-wheel automatic braking;

FIG. 12 shows an example of respective maps 1, 2 and 3 used in a process of FIG. 11.

MODE FOR CARRYING OUT THE INVENTION

Below, the best mode for carrying out the present invention will be described with reference to the drawings.

Figure 1:
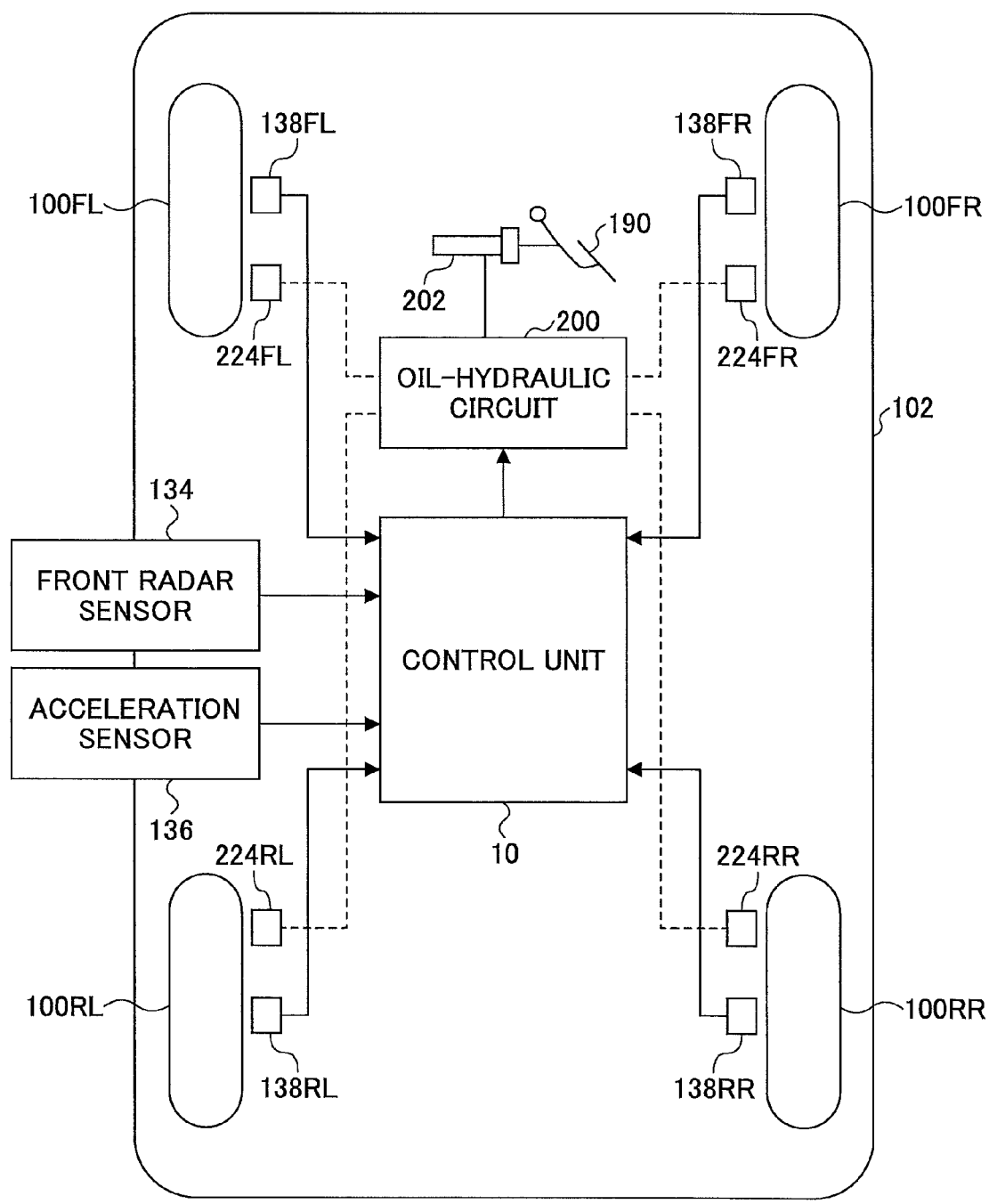
FIG. 1 is a general configuration diagram showing a main configuration of an vehicle braking apparatus 1 in one embodiment according to the present invention and essential parts of a vehicle 101 in which the vehicle braking apparatus 1 is mounted.

FIG. 1 is a general configuration diagram showing a main configuration of a vehicle braking apparatus 1 in one embodiment according to the present invention and essential parts of a vehicle 101 in which the vehicle braking apparatus 1 is mounted.

In FIG. 1, 100FL and 100FR denote front wheels at the left and right in the vehicle, respectively, and 100RL and 100RR denote rear wheels as driving wheels of the vehicle at the left and right in the vehicle, respectively. Note that the left and right front wheels 100FL and 100FR can be steered by a power steering system driven in response to turning of a steering wheel via a tie rod.

The vehicle braking apparatus 1 includes a control unit 10 and an oil-hydraulic circuit 200. Braking force for the wheels 100FR, 100FL, 100RR and 100RL is generated, respectively, by oil pressure supplied by the oil-hydraulic circuit 200 to wheel cylinders 224FR, 224FL, 224RR and 224RL. The oil-hydraulic circuit 200 includes a master cylinder 202. The master cylinder 202 generates the oil pressure supplied to the wheel cylinders 224FR, 224FL, 224RR and 224RL in response to a stepping operation on a brake pedal 190 by a driver.

The control unit 10 can include an ECU (Electronic Control Unit) including a microcomputer. Functions of the control unit 10 can be implemented by hardware, software or a combination thereof. For example, some or all of the functions of the control unit 10 can be implemented by an ASIC (application-specific integrated circuit), a FPGA (Field Programmable Gate Array) or a DSP (digital signal processor). Further, the functions of the control unit 10 can be implemented by a plurality of ECUs in a cooperating manner.

A front radar sensor 134 is connected with the control unit 10. The front radar sensor 134 uses radio waves (for example, millimeter waves), light waves (for example, laser) or ultrasonic waves as detection waves and detects a state of a front obstacle in front of the vehicle (typically, a front vehicle). The front radar sensor 134 detects information indicating a relationship between the front obstacle and the own vehicle such as a relative speed, a relative distance or an azimuth (lateral position) of the front obstacle with respect to the own vehicle every predetermined cycle. Note that in a case where the front radar sensor 134 is a millimeter wave radar sensor, the millimeter wave radar sensor can be a millimeter wave sensor of, for example, an electronic scanning type. In this case, the relative speed of a front obstacle is detected by using a Doppler frequency (frequency shift) of radio waves, the relative distance of the front obstacle is detected by using a delay time of reflected waves and the azimuth of the front obstacle is detected by using phase differences in received waves among a plurality of reception antennas. These items of detection data are transmitted to the control unit 10 at a predetermined cycle.

Wheel speed sensors 138FR, 138FL, 138RR and 138RL placed at the respective wheels in the vehicle are connected with the control unit 10. The wheel speed sensors 138FR, 138FL, 138RR and 138RL can be active sensors or passive sensors. Further, also an acceleration sensor 136 is connected with the control unit 10 for detecting acceleration in forward and backward directions of the vehicle. The acceleration sensor 136 is, for example, mounted below the center console of the vehicle. The acceleration sensor 136 can be implemented by a semiconductor sensor that integrally includes an acceleration sensor part that outputs a signal according to acceleration in the vehicle forward and backward directions or the vehicle width directions occurring in the vehicle in which it is mounted and a yaw rate sensor part that outputs a signal according to an angular velocity around the center of gravity occurring in the vehicle.

The oil-hydraulic circuit 200 is connected with the control unit 10. The control unit 10 controls various valves (described later) and so forth provided in the oil-hydraulic circuit 200 to control the braking forces for the respective wheels 100FL, 100FR, 100RL and 100RR. A control method by the control unit 10 will be described in detail later.

Figure 2:
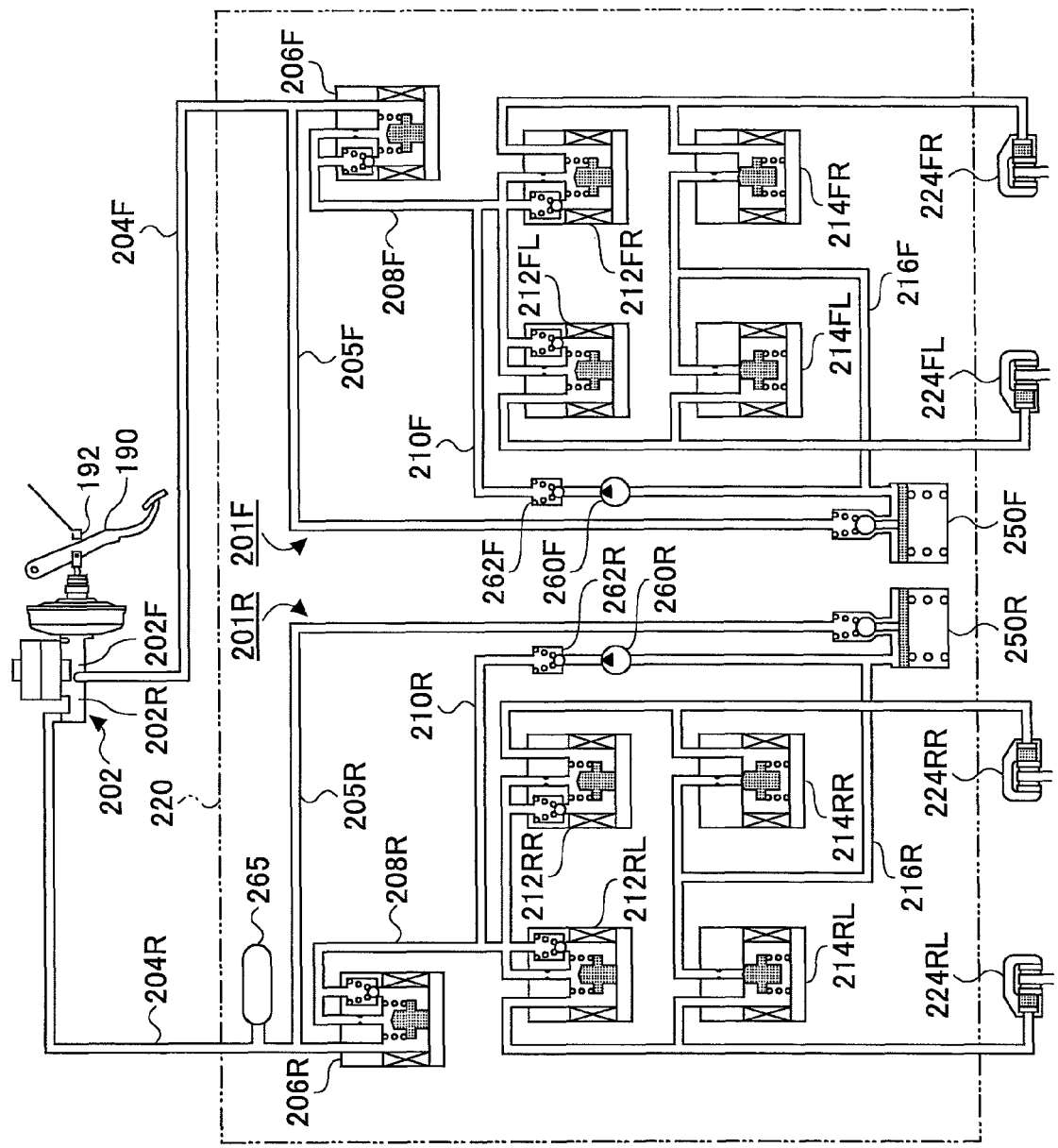
FIG. 2 shows one example of an oil-hydraulic circuit 200 using front-rear piping.

FIG. 2 shows one example of the oil-hydraulic circuit 200 using front-rear piping.

The oil-hydraulic circuit 200 shown in FIG. 2 includes two systems of oil-hydraulic circuits 201F and 201R. In an example shown in FIG. 2, the two systems of oil-hydraulic circuits 201F and 201R include front-rear piping in which the system is divided for the front wheels 100FL and 100FR and the rear wheels 100RL and 100RR. Below, the oil-hydraulic circuit 201F will be referred to as a front-wheel-system oil-hydraulic circuit 201F and the oil-hydraulic circuit 201R will be referred to as a rear-wheel-system oil-hydraulic circuit 201R. Note that in FIG. 2, a part 220 surrounded by a double-dashed chain line can be implemented as a brake actuator.

The master cylinder 202 includes a first master cylinder chamber 202F and a second master cylinder chamber 202R defined by free pistons (not shown). Force is applied to hold the free pistons in predetermined positions by compression coil springs at both sides of the master cylinder 202.

First, the front-wheel-system oil-hydraulic circuit 201F will be described. One end of a master cylinder passage 204F for the front wheels is connected to a first master cylinder chamber 202F. The other end of the master passage 204F for the front wheels is connected to a master cylinder cut solenoid valve 206F (hereinafter, referred to as a M/C cut valve 206F). The M/C cut valve 206F is a normally open valve that has an open state when it is not controlled. The open/closed state of the M/C cut valve 206F is controlled by the control unit 10 and the M/C cut valve 206F has a function of adjusting the oil pressure generated by a pump 260F. The opening of the M/C cut valve 206F can be linearly controlled and the M/C cut valve 206F generates control oil pressure according to the opening.

In the master passage 204F for the front wheels, a flow passage 205F is connected between the M/C cut valve 206F and the master cylinder 202. The flow passage 205F communicates with a reservoir 250F. One end of a pump passage 210F is connected to the reservoir 250F. The other end of the pump passage 210F is connected to a high-pressure flow passage 208F. In the pump passage 210F, the pump 260F and a check valve 262F are provided. The discharge end of the pump 260F is connected with the high-pressure flow passage 208F via the check valve 262F. The pump 260F is driven by, for example, a motor (not shown). The pump 260F is controlled by the control unit 10. The pump 260F can be of any type such as a piston type. For example, the pump 260F can include, although not shown, a cam shaft decentered from the motor's rotation shaft and a piston within a cylinder placed along the outer circumference of the cam shaft. In this configuration, the piston within the cylinder moves forward and back while the cam shaft is rotated due to rotation of the motor, suctions oil when moving toward the center and discharges the oil when moving outward. When the pump 260F operates, it draws oil from the reservoir 250F and forcibly feeds the oil to the high-pressure flow passage 208F through the pump passage 210F via the check valve 262F (see FIG. 3). Note that the oil-hydraulic circuit 200 does not include an accumulator that stores high-pressure oil discharged by the pump 260F.

The high-pressure flow passage 208F that communicates with the wheel cylinders 224FL and 224FR is connected to the M/C cut valve 206F. The high-pressure flow passage 208F branches into two and communicates with the wheel cylinders 224FL and 224FR. At the respective flow passage parts after the branch, retaining solenoid valves 212FL and 212FR are provided respectively, and also, pressure-reduction solenoid valves 214FL and 214FR are provided respectively. The retaining solenoid valves 212FL and 212FR are normally open valves having open states when they are not controlled. The open/closed states of the retaining solenoid valves 212FL and 212FR are controlled by the control unit 10. The pressure-reduction solenoid valves 214FL and 214FR are normally closed valves having closed states when they are not controlled. The open/closed states of the pressure-reduction solenoid valves 214FL and 214FR are controlled by the control unit 10. The pressure-reduction solenoid valves 214FL and 214FR are connected with the reservoir 250F via a pressure-reduction passage 216F.

Next, the rear-wheel-system oil-hydraulic circuit 201R will be described. To the second master cylinder chamber 202R, one end of a master passage 204R for the rear wheels is connected. In the master passage 204R for the rear wheels, a master-cylinder pressure sensor 265 is provided. The master-cylinder pressure sensor 265 generates a signal according to the master cylinder pressure generated in the master passage 204R. The output signal of the master-cylinder pressure sensor 265 is supplied to the control unit 10.

The other end of the master passage 204R for the rear wheels is connected with a master cylinder cut solenoid valve 206R (hereinafter, referred to as a M/C cut valve 206R). The M/C cut valve 206R is a normally open valve having the open state when it is not controlled. The M/C cut valve 206R has a function of adjusting oil pressure generated by the pump 260R as a result of its open/closed state thereof being controlled by the control unit 10. The opening of the M/C cut valve 206R can be controlled and the M/C cut valve 206R generates controlled oil pressure depending on the opening.

A flow passage 205R is connected to the master passage 204R for the rear wheels between the M/C cut valve 206R and the master cylinder 202. The flow passage 205R communicates with a reservoir 250R. To the reservoir 250R, one end of the pump passage 210R is connected. To the other end of the pump passage 210R, a high-pressure flow passage 208R is connected. In the pump passage 210R, the pump 260R and a check valve 262R are provided. The discharge end of the pump 260R is connected with the high-pressure flow passage 208R via the check valve 262R. The pump 260R is driven by, for example, a motor (not shown). This motor can be the same as the motor that drives the pump 260F for the front wheels. The pump 260R is controlled by the control unit 10. When the pump 260R operates, it draws oil from the reservoir 250R and forcibly feeds the oil to the high-pressure flow passage 208R through the pump passage 210R via the check valve 262R (see FIG. 3). Note that the oil-hydraulic circuit 200 does not include an accumulator that stores high-pressure oil discharged by the pump 260R.

To the M/C cut valve 206R, the high-pressure flow passage 208R that communicates with the wheel cylinders 224RL and 224RR is connected. The high-pressure flow passage 208R branches into two and communicates with the wheel cylinders 224RL and 224RR. At the respective flow passage parts after the branch, retaining solenoid valves 212RL and 212RR are provided, respectively, and also, pressure-reduction solenoid valves 214RL and 214RR are provided, respectively. The retaining solenoid valves 212RL and 212RR are normally open values having the open states when they are not controlled. The open/closed states of the retaining solenoid valves 212RL and 212RR are controlled by the control unit 10. The pressure-reduction solenoid valves 214RL and 214RR are normally closed valves having the closed states when they are not controlled. The open/closed states of the pressure-reduction solenoid valves 214RL and 214RR are controlled by the control unit 10. The pressure-reduction solenoid valves 214RL and 214RR are connected with the reservoir 250R via a pressure-reduction passage 216R.

Here, in the state of FIG. 2, the respective valves (the M/C cut valves 206F and, 206R, the retaining solenoid valves 212FL, 212FR, 212RL and 212RR, and the pressure-reduction solenoid valves 214FL, 214FR, 214RL and 214RR) have the non-controlled positions (normal positions), and the pumps 260F are 260R are in the non-operating states. Thereby, to the wheel cylinders 224FL and 224FR, the pressure inside the first master cylinder chamber 202F is supplied. To the wheel cylinders 224RL and 224RR, the pressure inside the second master cylinder chamber 202R is supplied. Therefore, at a time of normal braking, the pressure inside the wheel cylinder for each wheel, i.e., the braking force, increases/decreases according to an operation amount (leg-power) to the brake pedal 190.

Next, flows of oil when the pumps 260F and 260R operate will be described.

Figure 3:
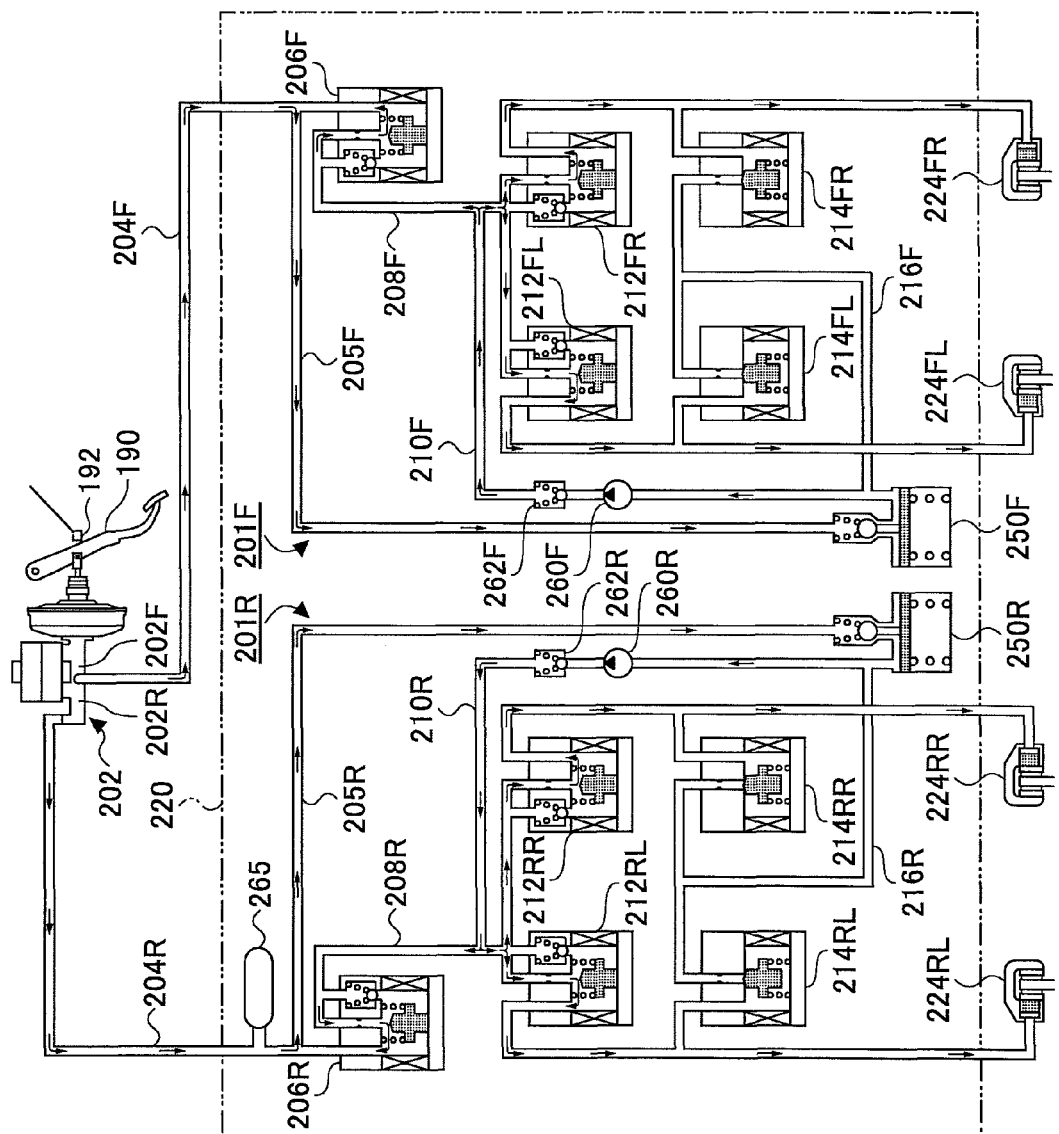
FIG. 3 schematically shows flows of oil when pumps 260F and 260R operate in the oil-hydraulic circuit 200 shown in FIG. 2.

FIG. 3 schematically shows flows of oil when the pumps 260F and 260R operate in the oil-hydraulic circuit 200 shown in FIG. 2. Hereinafter, flows of oil when the pump 260F operates in the front-wheel-system oil-hydraulic circuit 201F will be described. However, concerning when the pump 260R operates, it is substantially the same as when the pump 260F operates.

When the pump 260F operates, the oil flowing through the flow passage 205F from the master cylinder 202 is forcibly fed to the high-pressure flow passage 208F through the pump passage 210F via the check valve 262F. This oil is supplied from the high-pressure flow passage 208F to the wheel cylinders 224FL and 224FR when the retaining solenoid valves 212FL and 212FR are in the open positions, and the pressures (wheel cylinder pressures) inside the wheel cylinders 224FL and 224FR increase. Note that in the shown state, the pressure-reduction solenoid valves 214FL and 214FR are in closed positions and are in pressure boost states where the wheel cylinder pressures increase. When the pressure-reduction solenoid valves 214FL and 214FR are opened in this state, the oil flows to the reservoir 250F via the pressure-reduction passage 216F and the wheel cylinder pressures in the wheel cylinders 224FL and 224FR are reduced. On the other hand, when the retaining solenoid valves 212FL and 212FR are closed in the shown state, the wheel cylinder pressures in the wheel cylinders 224FL and 224FR are retained.

Further, the oil forcibly fed to the high-pressure flow passage 208F flows to the master passage 204F via the M/C cut valve 206F. The flow rate of the oil varies depending on the open/closed state (opening) of the M/C cut valve 206F (see FIG. 4).

Thus, when the pumps 260F and 260R operate, the pressure pumped-up by the pump 260F is supplied to the wheel cylinders 224FL and 224FR and the pressure pumped-up by the pump 260R is supplied to the wheel cylinders 224RL and 224RR. Therefore, the braking pressures for the respective wheels can be controlled according to the operation states of the respective valves (the M/C cut valves 206F and 206R, the retaining solenoid valves 212FL, 212FR, 212RL and 212RR, and the pressure-reduction solenoid valves 214FL, 214FR, 214RL and 214RR) without regard to an operation amount applied to the brake pedal 190.

Next, operations of the M/C cut valves 206F and 206R will be described.

Figure 4:
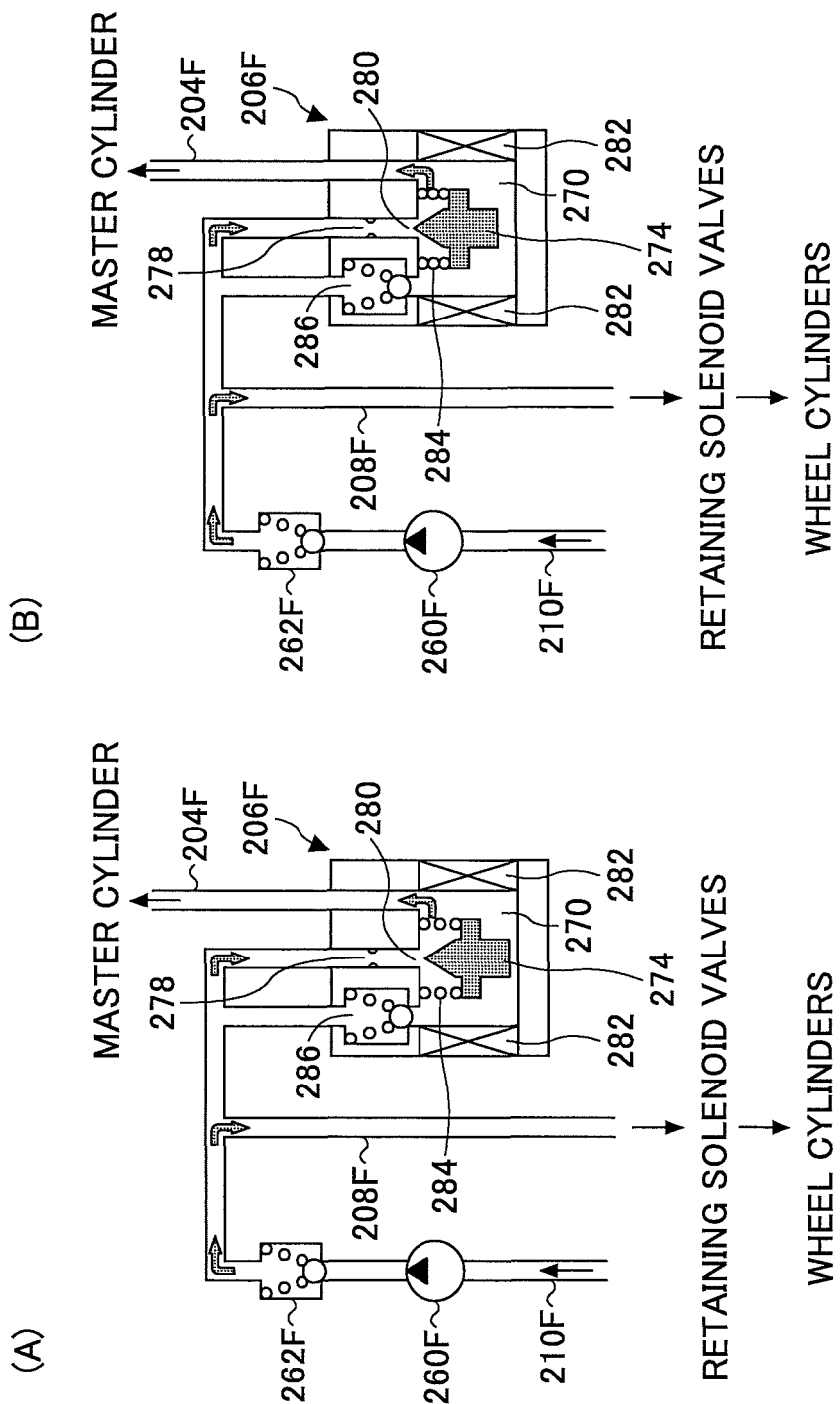
FIG. 4 illustrates operations of a M/C cut valve 206F.

FIG. 4 illustrates operations of the M/C cut valve 206F, where (A) shows a state where the opening of the M/C cut valve 206F is relatively small and (B) shows a state where the opening of the M/C cut valve 206F is further smaller. Note that operations of the M/C cut valve 206R can be the same.

In the shown example, in the M/C cut valve 206F, a valve element 274 is placed in a valve chest 270 in such a manner that the value element 274 can move forward and backward. To the valve chest 270, the master passage 204F for the front wheels from the master cylinder 202 is connected, and also, the high-pressure flow passage 208F communicating with the wheel cylinders 224FR and 224FL is connected via an inner passage 278 and a port 280. Around the valve element 274, a solenoid 282 is placed, and force is applied to the valve element 274 toward the open position by a compression spring 284. When a driving voltage is applied to the solenoid 282, force is applied to the valve element 274 toward the port 280 against the spring force of the compression spring 284.

As shown in FIG. 4, when the opening of the M/C cut valve 206F is reduced, the oil forcibly fed from the pump 260F to the high-pressure flow passage 208F partially flows to the master passage 204F via the M/C cut valve 206F and the part of the oil flowing to the master passage 204F via the M/C cut valve 206F is reduced. Thereby, it is possible to generate high wheel cylinder pressure in the wheel cylinders 224FL and 224FR. Thus, the control unit 10 can control the oil pressure inside the high-pressure flow passage 208F (the differential pressure between the oil pressure inside the master passage 204F and the oil pressure inside the high-pressure flow passage 208F) by controlling the magnitude of the electric current (differential pressure instruction value) applied to the solenoid 282 of the M/C cut valve 206F. Note that in the shown example, the M/C cut valve 206F includes a check valve 286 inside allowing only the flow of oil from the valve chest 270 toward the high-pressure flow passage 208F.

Next, oil pressure control will be described which is carried out by the control unit 10 when predetermined emergency deceleration is required and is carried out in the oil-hydraulic circuit 200 using front-rear piping.

Figure 5:
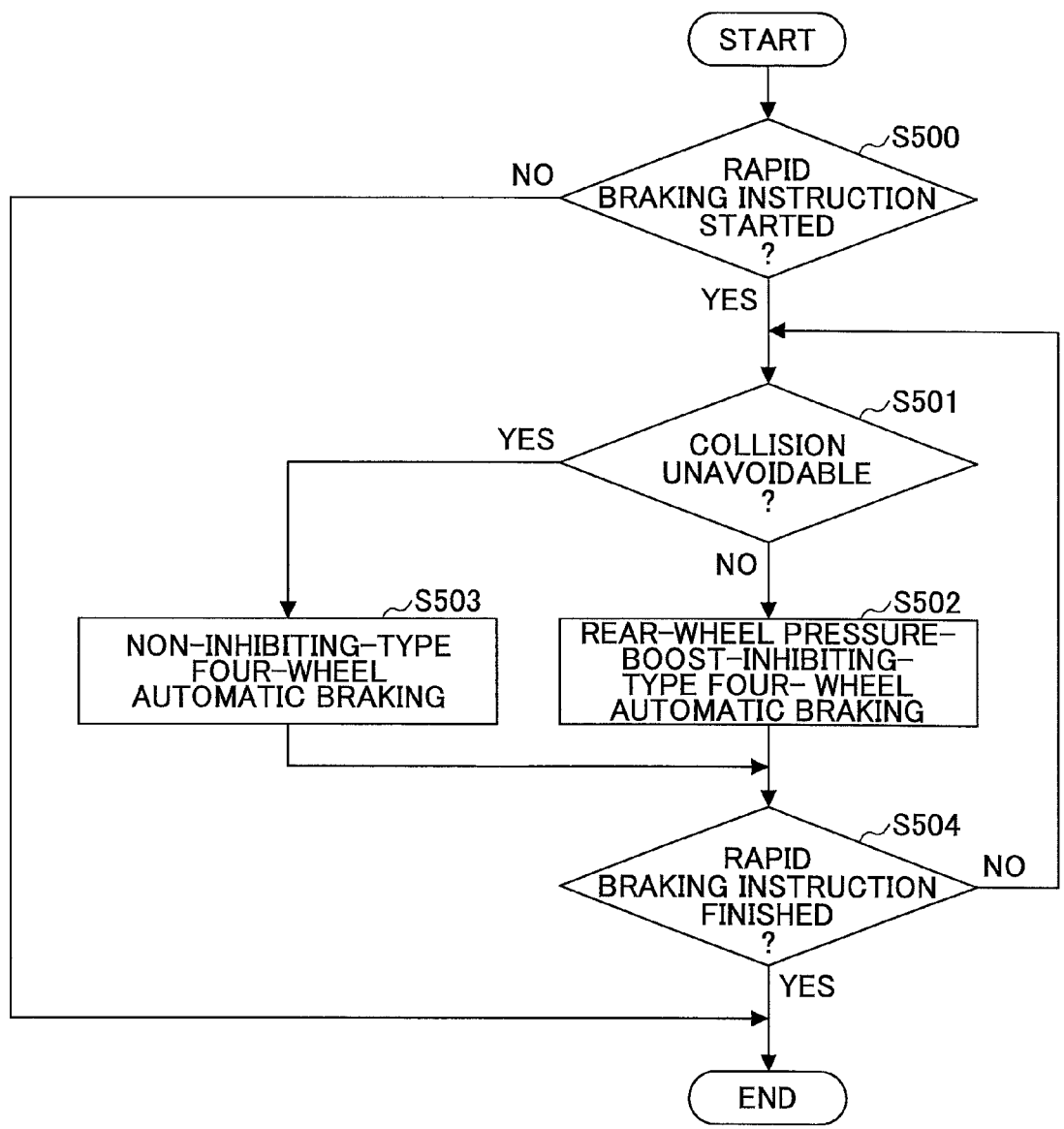
FIG. 5 is a flowchart showing one example of oil pressure control carried out by a control unit 10 in the oil-hydraulic circuit 200 using front-rear piping.

FIG. 5 is a flowchart showing one example of oil pressure control carried out by the control unit 10 in the oil-hydraulic circuit 200 using front-rear piping. A process routine shown in FIG. 5 can be repeatedly carried out every predetermined cycle during vehicle running.

In step 500, the control unit 10 determines a rapid braking instruction start condition. The rapid braking instruction start condition can be satisfied when predetermined emergency deceleration is required. For example, such a configuration can be provided that, concerning control of avoiding a collision with a front obstacle, a time required for a collision with a front obstacle: TTC (Time To Collision), is calculated, and the condition is satisfied when the calculated TTC becomes less than a predetermined time (for example, 1 second). In this case, the control unit 10 calculates a TTC concerning a front obstacle within a predetermined azimuth (lateral position) based on the detection result of the front radar sensor 134, and proceeds to step 502 when the calculated TTC becomes less than the predetermined value (for example, 1 second). Note that a TTC can be derived from dividing the relative distance to a front obstacle by the relative speed with respect to the front obstacle. Further, concerning automatic driving control, such a configuration can be provided that, for example, the condition is satisfied when the magnitude of deceleration required for keeping a predetermined inter-vehicular distance lower limit exceeds a predetermined value. When the rapid braking instruction start condition is satisfied, the control unit 10 proceeds to step 502. Otherwise, the control unit 10 finishes the process.

In step 501, the control unit 10 determines whether a collision with a front obstacle (including a front vehicle) is unavoidable. That is, the control unit 10 determines whether the likelihood of colliding with a front obstacle is greater than or equal to a predetermined level (in this case, 100%). A method of determining whether a collision with a front obstacle is unavoidable is well-known in a pre-crash safety field; there are various methods and any method can be employed. For example, it is possible to previously calculate a relative speed at which a collision is avoidable for each timing (TTC) where four-wheel automatic braking is started and create a collision unavoidability determination map based on the calculation results. In this case, such a configuration can be provided that the control unit 10 reads the collision unavoidability determination map based on the relative speed and the TTC with respect to a front obstacle, and determines whether a collision with the front obstacle is unavoidable. Specifically, the following relationship of deceleration G (m/s$^2$) and the deceleration speed V (m/s) after t seconds from the start of four-wheel automatic braking holds assuming the maximum speed G (m/s$^2$) and the deceleration slope J (m/s$^3$):

$G=Jt$, $V=J \times t^2/2$, when $t \leq G_{MAX}/J$, $G=G_{MAX}$, $V=G_{MAX}^2/(2J)+G_{MAX}(t-G_{MAX}/J)$, when $G_{MAX}/J<t$ In this case, it is also possible to regard the relative speed higher than the deceleration speed V after t seconds as the collision unavoidable relative speed and create the collision unavoidability determination map. Alternatively, it is also possible to create the collision unavoidability determination map using the relative distance as a parameter by obtaining the relative distance by integrating the deceleration speed V. Further alternatively, as a further complicated algorithm, it is also possible to consider acceleration of a front obstacle, or the like. Further alternatively, as an easier way in reverse, it is also possible to determine that a collision is unavoidable when a TTC becomes less than a predetermined value.

When the control unit 10 determines, in the step 501, that a collision with a front obstacle is unavoidable, the control unit 10 proceeds to step 503. When determining that a collision with a front obstacle is not unavoidable (that is, is avoidable), the control unit 10 proceeds to step 502.

In step 502, the control unit 10 carries out four-wheel automatic braking (hereinafter, also referred to as "rear-wheel pressure-boost-inhibiting-type four-wheel automatic braking") inhibiting a pressure boost by the rear-wheel-system oil-hydraulic circuit 201R based on target control values. Specifically, the control unit 10 operates the pumps 260F and 260R, also controls the M/C cut valves 206F and 206R, and boosts the wheel cylinder pressures of the wheel cylinders 224FL, 224FR, 224RL and 224RR. At this time, the control unit 10 controls the M/C cut valves 206F and 206R in such a manner as to prevent the wheel cylinder pressures of the wheel cylinders 224RL and 224RR for the rear wheels from exceeding the wheel cylinder pressures of the wheel cylinders 224FL and 224FR for the front wheels. This pressure boost inhibition for the rear wheel system can be implemented in various matters, and can be implemented in any manner. For example, concerning timing of starting a pressure boost toward an oil pressure target value, it is possible to cause the timing of a pressure boost using the rear-wheel-system oil-hydraulic circuit 201R to be later than the timing of a pressure boost using the front-wheel-system oil-hydraulic circuit 201F by a predetermined delay time ΔT. Note that another specific method of inhibiting a pressure boost for the rear wheel system will be described later.

Target control values can also be set for any physical values concerning wheel cylinder pressures. For example, target control values can be target deceleration, oil pressure target values for wheel cylinder pressures, target values of pressure boost slopes for wheel cylinder pressures, or target values for differential pressure instruction values (electric current values to be applied) for the M/C cut valves 206F and 206R. Target control values can be fixed values or variable values that are set depending on relative relationship with respect to a front obstacle (TTC or the like). In a case of fixed values, target control values can be, for example, 6.0 m/s$^2$ in target deceleration or 5 Mpa in oil pressure target value for each wheel cylinder pressure.

In step 503, the control unit 10 carries out four-wheel automatic braking based on target control values. At this time, the control unit 10 carries out four-wheel automatic braking (hereinafter, also referred to as "non-inhibiting-type four-wheel automatic braking") not inhibiting a pressure boost by the rear-wheel-system oil-hydraulic circuit 201R instead of four-wheel automatic braking (rear-wheel pressure-boost-inhibiting-type four-wheel automatic braking) inhibiting a pressure boost by the rear-wheel-system oil-hydraulic circuit 201R such as that carried out in the above-mentioned step 502. Specifically, the control unit 10 operates the pumps 260F and 260R, also controls the M/C cut valves 206F and 206R in the same manner and boosts the wheel cylinder pressures of the wheel cylinders 224FL, 224FR, 224RL and 224RR. Note that the target control values in non-inhibiting-type four-wheel automatic braking can be the same as the target control values in rear-wheel pressure-boost-inhibiting-type four-wheel automatic braking, or can have values higher than the target control values in rear-wheel pressure-boost-inhibiting-type four-wheel automatic braking.

In step 504, the control unit 10 determines a rapid braking instruction finish condition. Such a configuration can be provided that the rapid braking instruction finish condition is satisfied, for example, when a collision is detected based on the acceleration sensor 136 or the like, when the vehicle body speed becomes 0 km/h, when a TTC exceeds 1.5 [seconds] or when the rapid braking instruction continues for a predetermined time (for example, 3 seconds) or more. When the rapid braking instruction finish condition is satisfied, the control unit 10 finishes the process. Otherwise, the control unit 10 returns to step 501.

Note that four-wheel automatic braking in the above-mentioned steps 502 and 503 is carried out under the condition where, typically, the driver does not operate the brake pedal 190. That is, target control values used in the above-mentioned steps 502 and 503 are values (including fixed values) determined based on factors other than an operation amount to the brake pedal 190. Note that when the driver's operation of the brake pedal 190 (for example, detected based on a leg-power switch 192) is performed after four-wheel automatic braking is started, such a configuration can be provided that, for example, the operation of the brake pedal 190 is ignored and the four-wheel automatic braking is continued. Alternatively, such a configuration can also be provided that, in a case of the above-mentioned step 502, when a driver operates the brake pedal 190 after rear-wheel pressure-boost-inhibiting-type four-wheel automatic braking is started, the braking is shifted to normal braking when the master cylinder pressure becomes greater than or equal to a predetermined pressure. In this case, it is also possible that both the oil pressures are added together (or the greater one is selected), and the obtained pressure is applied to the wheel cylinders 224FL, 224FR, 224RL and 224RR. This method is not possible in the configuration of the oil-hydraulic circuit 200 shown in FIG. 2 but is possible in another oil-hydraulic circuit configuration.

However, it is also possible that four-wheel automatic braking in the above-mentioned steps 502 and 503 is carried out under the condition where a driver operates the brake pedal 190. In this case, such a configuration can be provided that depending on whether a driver operates the brake pedal 190, rapid braking instruction start condition is varied. For example, such a configuration can be provided that when a driver operates the brake pedal 190, a TTC as a threshold with which the rapid braking instruction start condition is satisfied is changed into a longer time (for example, 1.5 seconds). In any way, such a configuration can be provided that when four-wheel automatic braking is started, an operation of the brake pedal 190 is ignored. That is, target control values used in the above-mentioned steps 502 and 503 can be determined based on factors other than an operation amount to the brake pedal 190. Alternatively, in the same as the above-described way, such a configuration can be provided that, in a case of the above-mentioned step 502, when a driver still operates the brake pedal 190 even after rear-wheel pressure-boost-inhibiting-type four-wheel automatic braking is started, the braking is shifted to normal braking when the master cylinder pressure becomes greater than or equal to a predetermined pressure. In this case, it is also possible that both the oil pressures are added together (or the greater one is selected), and the obtained pressure is applied to the wheel cylinders 224FL, 224FR, 224RL and 224RR. This method is not possible in the configuration of the oil-hydraulic circuit 200 shown in FIG. 2 but is possible in another oil-hydraulic circuit configuration.

Further, in four-wheel automatic braking in the above-mentioned steps 502 and 503, the retaining solenoid valves 212FL, 212FR, 212RL and 212RR and the pressure-reduction solenoid valves 214FL, 214FR, 214RL and 214RR are all kept in the normal states. The retaining solenoid valves 212FL, 212FR, 212RL and 212RR and the pressure-reduction solenoid valves 214FL, 214FR, 214RL and 214RR are controlled individually for the respective wheels in vehicle stabilizing control such as VSC (Vehicle Stability Control). However, four-wheel automatic braking in the above-mentioned step 502 corresponds to controlling for each system, and no different ways of controlling are carried out within the same system. However, it is also possible that vehicle stabilizing control such as ABS (anti-lock braking system) or VSC operates after rear-wheel pressure-boost-inhibiting-type four-wheel automatic braking in the above-mentioned step 502 is started. In this case, such a configuration can be provided that rear-wheel pressure-boost-inhibiting-type four-wheel automatic braking is stopped. Alternatively, such a configuration can also be provided that while rear-wheel pressure-boost-inhibiting-type four-wheel automatic braking is continued, the above-mentioned other controlling is carried out. In the latter case, such a configuration can be provided that while the M/C cut valves 206F and 206R are controlled in the same manner as the time of rear-wheel pressure-boost-inhibiting-type four-wheel automatic braking, the retaining solenoid valves 212FL, 212FR, 212RL and 212RR and the pressure-reduction solenoid valves 214FL, 214FR, 214RL and 214RR are controlled according to the control rule of ABS or vehicle stabilizing control.

Next, specific examples of the pressure boost inhibiting method for the rear wheel system, employable in the above-described steps 502 and 503 shown in FIG. 5, will be described.

FIG. 6 shows one example of time series (target control value patterns) of target control values that are set for the front wheel system and the rear wheel system in a case of rear-wheel pressure-boost-inhibiting-type four-wheel automatic braking. Here, in one example, target control values are those for wheel cylinder pressures. In FIG. 6, a time series of an oil pressure target value (front oil pressure target value) for the wheel cylinder pressures of the wheel cylinders 224FL and 224FR for the front wheels and a time series of an oil pressure target value (rear oil pressure target value) for the wheel cylinder pressures of the wheel cylinders 224RL and 224RR for the rear wheels are shown by broken lines. Also, a time series of the actual oil pressure value for the wheel cylinder pressures of the wheel cylinders 224FL and 224FR for the front wheels (front actual oil pressure target value) and a time series of the actual oil pressure value for the wheel cylinder pressures of the wheel cylinders 224RL and 224RR for the rear wheels (rear actual oil pressure target value) when control is carried out according to these patterns of the oil pressure target values are shown by solid lines.

In the example shown in FIG. 6, the rising timing of the rear oil pressure target value is caused to be later than the rising timing of the front oil pressure target value by a predetermined delay time $\Delta T$. Specifically, the front oil pressure target value increases toward a final front oil pressure target value (in the example, 5 Mpa) when a rapid braking instruction is started. On the other hand, the rear oil pressure target value increases toward a final rear oil pressure target value (in the example, 5 Mpa) after the predetermined delay time $\Delta T$ from when the rapid braking instruction was started. Note that the final target values (the final front oil pressure target value and the final rear oil pressure target value) can correspond to the target control values to be finally achieved in rear-wheel pressure-boost-inhibiting-type four-wheel automatic braking.

In the example shown in FIG. 6, the rising timing of the rear oil pressure target value is caused to be later then the rising timing of the front oil pressure target value by the predetermined delay time $\Delta T$, and therefore, as shown in FIG. 6, it is possible to prevent the wheel cylinder pressures of the wheel cylinders 224RL and 224RR for the rear wheels from exceeding the wheel cylinder pressures of the wheel cylinders 224FL and 224FR for the front wheels. Thereby, when emergency deceleration is required, it is possible to avoid rear wheel locking at a time of four-wheel automatic braking and it is possible to improve vehicle stability. From this viewpoint, the predetermined delay time $\Delta T$ is set preferably in consideration of character differences between the rear-wheel-system oil-hydraulic circuit 201R and the front-wheel-system oil-hydraulic circuit 201F, in particular, the difference in oil consumption required for generating the same wheel cylinder pressure. The predetermined delay time $\Delta T$ can be a fixed value, for example, 200 msec.

Note that in the example shown in FIG. 6, the front oil pressure target value and the rear oil pressure target value steeply rise and increase toward the final front oil pressure target value and the final rear oil pressure target value, respectively. However, it is also possible that they increase stepwise with two or more steps.

FIG. 7 shows one example of time series (target control value patterns) of target control values that are set for each of the front wheel system and the rear wheel system in a case of non-inhibiting-type four-wheel automatic braking. In FIG. 7, the same (common) target control value is employed for the front wheel system and the rear wheel system. In this case, each of the front oil pressure target value and the rear oil pressure target value increases toward the final oil pressure target value (in the example, 5 Mpa) when a rapid braking instruction is started. Thereby, it is possible to increase the deceleration maximally within a limited time without the rising timing of the rear oil pressure target value being delayed from the rising timing of the front oil pressure target value as in FIG. 6.

Note that, in this configuration, the wheel cylinder pressure of the wheel cylinders 224RL and 224RR for the rear wheels exceeds the wheel cylinder pressure of the wheel cylinders 224FL and 224FR for the front wheels as shown by the solid lines indicated as front actual oil pressure and rear actual oil pressure in FIG. 7 due to characteristic differences between the rear-wheel-system oil-hydraulic circuit 201R and the front-wheel-system oil-hydraulic circuit 201F. More specifically, because the capacity of a front caliper is significantly greater than the capacity of a rear caliper, the front-wheel-system oil-hydraulic circuit 201F requires greater oil consumption than the rear-wheel-system oil-hydraulic circuit 201R for generating the same oil pressure (see FIG. 8). Therefore, at a time of non-inhibiting-type four-wheel automatic braking, the wheel cylinder pressure of the wheel cylinders 224RL and 224RR for the rear wheels becomes higher earlier than the wheel cylinder pressure of the wheel cylinders 224FL and 224FR for the front wheels, and therefore, a rear wheel locking tendency may occur. However, non-inhibiting-type four-wheel automatic braking corresponds to controlling to be carried out when a collision is unavoidable as described above, and therefore, ensuring the deceleration as much as possible and reducing the collision speed take priority over vehicle stability.

Next, with reference to FIGS. 8 and 9, a preferable example of setting the predetermined delay time $\Delta T$ described above with reference to the example shown in FIG. 6 will be described.

Figure 8:
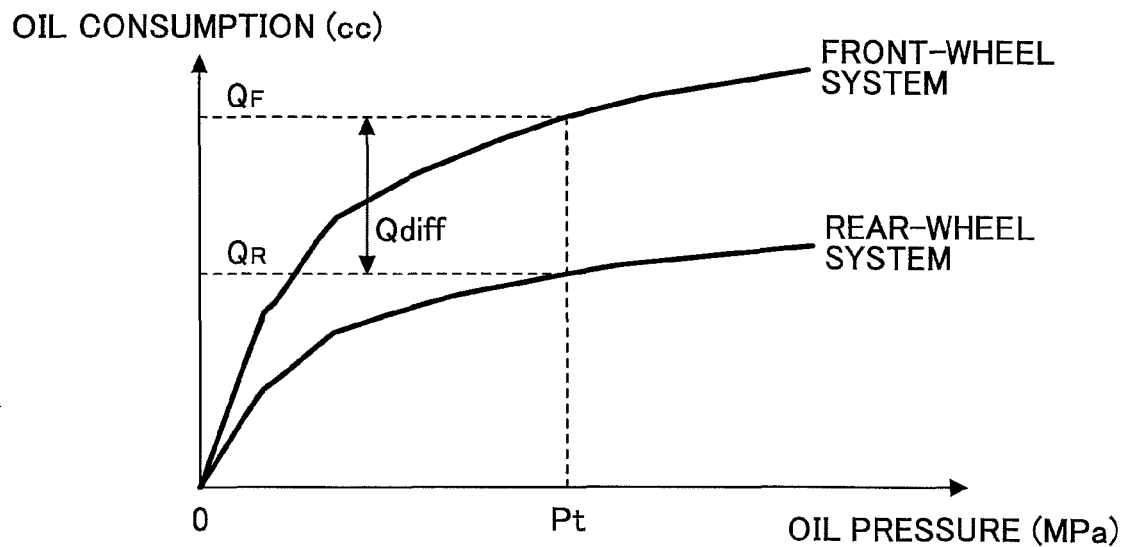
FIG. 8 is a characteristic diagram showing a relationship between wheel cylinder pressure and oil consumption.

FIG. 8 is a characteristic diagram showing a relationship between wheel cylinder pressure and oil consumption. In FIG. 8, the relationship in the front-wheel-system oil-hydraulic circuit 201F and the relationship in the rear-wheel-system oil-hydraulic circuit 201R are shown. As shown in FIG. 8, the oil consumption required for generating the same wheel cylinder pressure is different between the front-wheel-system oil-hydraulic circuit 201F and the rear-wheel-system oil-hydraulic circuit 201R. This is mainly based on differences in structures (for example, the difference between the capacity of the front caliper and the capacity of the rear caliper). Such a characteristic diagram can be obtained based on a test or calculation, or design values can be used.

Figure 9:
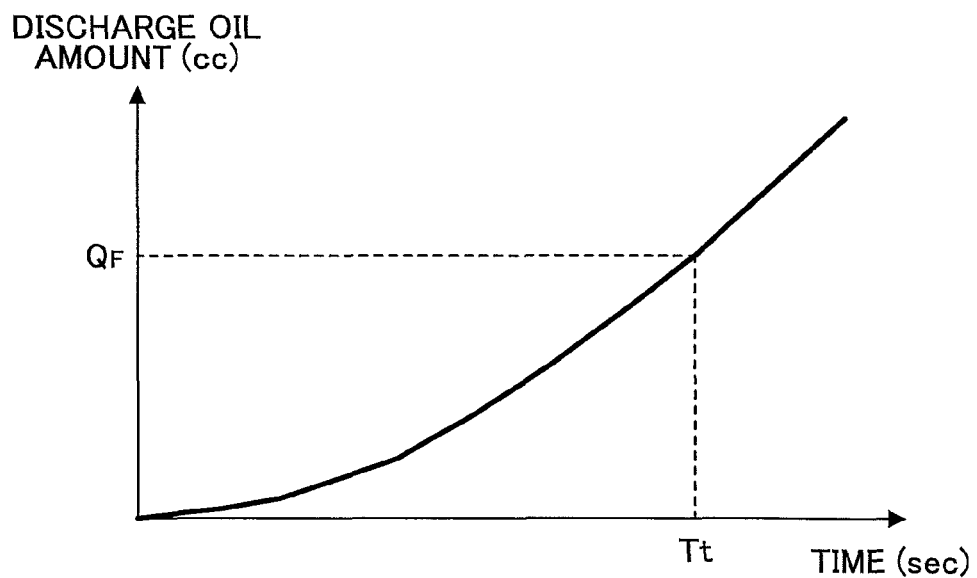
FIG. 9 is a characteristic diagram showing one example of a relationship of a discharge oil amount of a pump 260F with respect to time in a front-wheel-system oil-hydraulic circuit 201F.

FIG. 9 is a characteristic diagram showing one example of the discharge capability (discharge oil amount with respect to time) of the pump 260F in the front-wheel-system oil-hydraulic circuit 201F. Also such a characteristic diagram can be obtained based on a test or calculation, or a design value can be used.

Here, a case will be assumed where a final oil pressure target value for a wheel cylinder pressure is Pt. At this time, the oil consumption $Q_F$ required for achieving the final oil pressure target value Pt in the front-wheel-system oil-hydraulic circuit 201F and the oil consumption $Q_R$ required for achieving the final oil pressure target value Pt in the rear-wheel-system oil-hydraulic circuit 201R are obtained from the characteristic diagram as shown in FIG. 8. The oil consumption difference $Q_{diff}$ therebetween is $Q_F - Q_R$. At this time, the operating time $T_1$ required for obtaining the oil consumption $Q_F$ is obtained from the characteristic diagram as shown in FIG. 9. Then, it is possible to calculate the predetermined delay time $\Delta T$ by the following formula:

$$\Delta T = T_1 \times (Q_{diff}/Q_F) \qquad \text{Formula (1)}$$

Note that, when employing this calculation method, it is also possible that, in step 502 shown in FIG. 5 for example, the control unit 10 calculates the predetermined delay time $\Delta T$ based on the final oil pressure target value Pt and the characteristic diagrams shown in FIGS. 8 and 9. Alternatively, it is also possible that the relationship between the final oil pressure target value Pt and the predetermined delay time $\Delta T$ is created in a form of a map, and is stored in a memory. For example, it is possible that the respective predetermined delay times $\Delta T$ are calculated for a plurality of the final oil pressure target values Pt (for example, 1 Mpa, 3 Mpa, 5 Mpa and 7 Mpa) using Formula (1) and a map is created. In this case, the control unit 10 can read the predetermined delay time corresponding to the final oil pressure target value Pt. Note that, concerning a final oil pressure target value not prescribed in the map, it is possible to calculate the predetermined delay time ΔT corresponding to the final oil pressure target value not prescribed in the map by carrying out interpolation using predetermined delay times ΔT corresponding to final oil pressure target values near the final oil pressure target value not prescribed in the map.

Further, as another calculation method for a predetermined delay time ΔT, a predetermined delay time ΔT can be calculated by the following formula:

$$\Delta T = T_r - T_t \quad \text{Formula (2)}$$

Here, $T_{tR}$ denotes the operating time of the pump 260R required for obtaining the oil consumption $Q_R$. $T_{tR}$ can be calculated in the same way based on a characteristic diagram of a discharge oil amount with respect to time in the rear-wheel-system oil-hydraulic circuit 201R such as the characteristic diagram shown in FIG. 9. Also in this case, in the same way, it is possible that the respective predetermined delay times ΔT are calculated for a plurality of the final oil pressure target values Pt (for example, 1 Mpa, 3 Mpa, 5 Mpa and 7 Mpa) using Formula (2) and a map is created.

Figure 10:
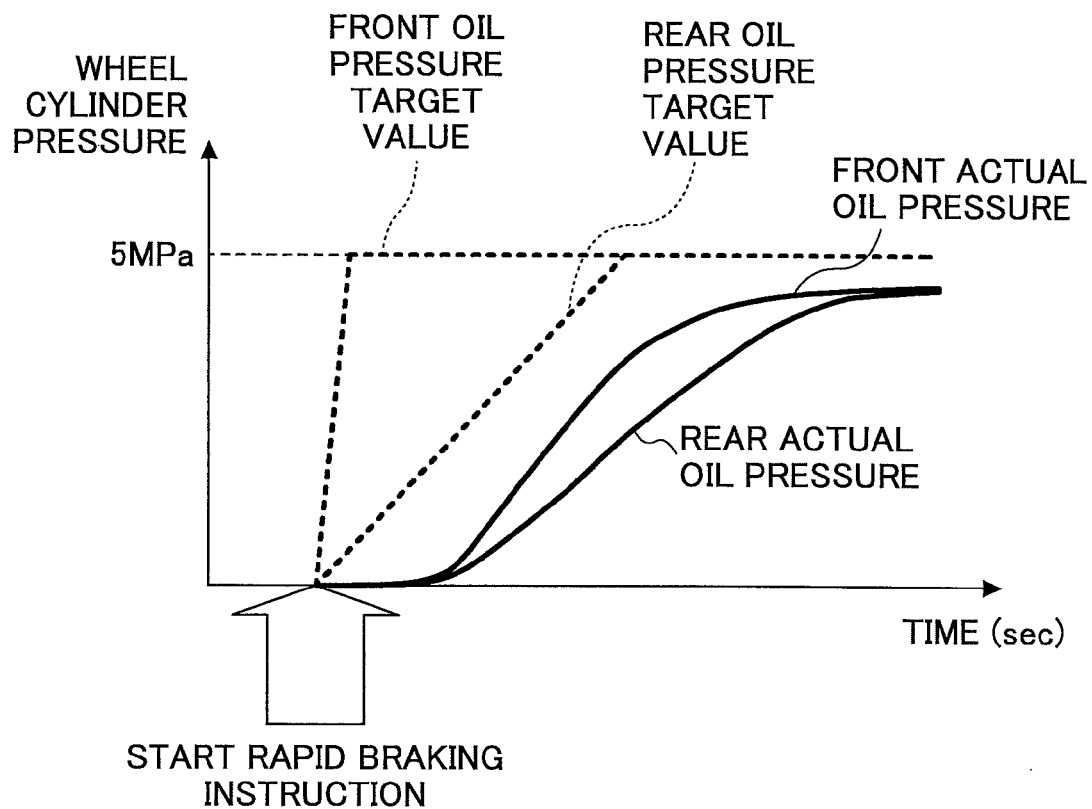
FIG. 10 shows another example of a time series (target control value patterns) of target control values that are set for the front wheel system and the rear wheel system in a case of rear-wheel pressure-boost-inhibiting-type four-wheel automatic braking.

FIG. 10 shows another example of time series (target control value patterns) of target control values that are set for the front wheel system and the rear wheel system in a case of rear-wheel pressure-boost-inhibiting-type four-wheel automatic braking. Here, as one example, it is assumed that target control values are oil pressure target values for the wheel cylinder pressures. In FIG. 10, the same as FIG. 6, a time series of an oil pressure target value for the wheel cylinder pressures of the wheel cylinders 224FL and 224FR for the front wheels (front oil pressure target value) and a time series of oil pressure target values for the wheel cylinder pressures of the wheel cylinders 224RL and 224RR for the rear wheels (rear oil pressure target value) are shown by broken lines. Also, a time series of the actual oil pressure value for the wheel cylinder pressures of the wheel cylinders 224FL and 224FR for the front wheels (front actual oil pressure target value) and a time series of the actual oil pressure value for the wheel cylinder pressures of the wheel cylinders 224RL and 224RR for the rear wheels (rear actual oil pressure target value) when control is carried out according to these patterns of the oil pressure target values are shown by solid lines.

In the example shown in FIG. 10, rising timing of the rear oil pressure target value is the same as rising timing of the front oil pressure target value. However, an increased slope of the rear oil pressure target value is set smaller than an increased slope of the front oil pressure target value. Specifically, when a rapid braking instruction is started, the front oil pressure target value increases at a relatively steep slope toward a final front oil pressure target value (in the example, 5 Mpa). On the other hand, when the rapid braking instruction is started, the rear oil pressure target value increases at a relatively gentle slope toward a final front oil pressure target value (in the example, 5 Mpa). Thus, for the increased slope of the rear oil pressure target value, an upper limit lower than the increased slope of the front oil pressure target value can be set. Note that the upper limit for the increased slope of the rear oil pressure target value (or the difference between the increased slope of the rear oil pressure target value and the increased slope of the front oil pressure target value) is set such as to prevent the wheel cylinder pressure of the wheel cylinders 224RL and 224RR for the rear wheels from exceeding the wheel cylinder pressure of the wheel cylinders 224FL and 224FR for the front wheels.

Here, as shown by the solid lines indicated as front actual oil pressure and rear actual oil pressure in FIG. 6, the rear actual oil pressure increases at a slope steeper than the front actual oil pressure as shown in FIG. 8 when the front oil pressure target value and the rear oil pressure target value increase at the same increased slope with time, due to the difference in the oil consumption between the front-wheel-system oil-hydraulic circuit 201F and the rear-wheel-system oil-hydraulic circuit 201R. Concerning this point, in the example shown in FIG. 10, as described above, the increased slope of the rear oil pressure target value is smaller than the increased slope of the front oil pressure target value. As a result, it is possible to reduce the difference between the increased slope of the rear actual oil pressure and the increased slope of the front actual oil pressure. Thereby, at a time of four-wheel automatic braking when emergency deceleration is required, it is possible to prevent the wheel cylinder pressure of the wheel cylinders 224RL and 224RR for the rear wheels from exceeding the wheel cylinder pressure of the wheel cylinders 224FL and 224FR for the front wheels, it is possible to avoid a rear wheel locking tendency, and it is possible to improve vehicle stability.

Note that it is also possible to combine the method shown in FIG. 10 with the method shown in FIG. 6. That is, it is possible to cause the rising timing of the rear oil pressure target value to be later than the rising timing of the front oil pressure target value, and also, set the increased slope of the rear oil pressure target value to be lower than the increased slope of the front oil pressure target value. Further, in the example shown in FIG. 10, the front oil pressure target value steeply rises and increases toward the final front oil pressure target value. However, it is also possible that the front oil pressure target value increases stepwise with two or more steps. The rear oil pressure target value gently rises and increases toward the final rear oil pressure target value. However, it is also possible that the rear oil pressure target value increases stepwise with two or more steps.

Next, another example of oil pressure control carried out by the control unit 10 when predetermined emergency deceleration is required will be described.

Figure 11:
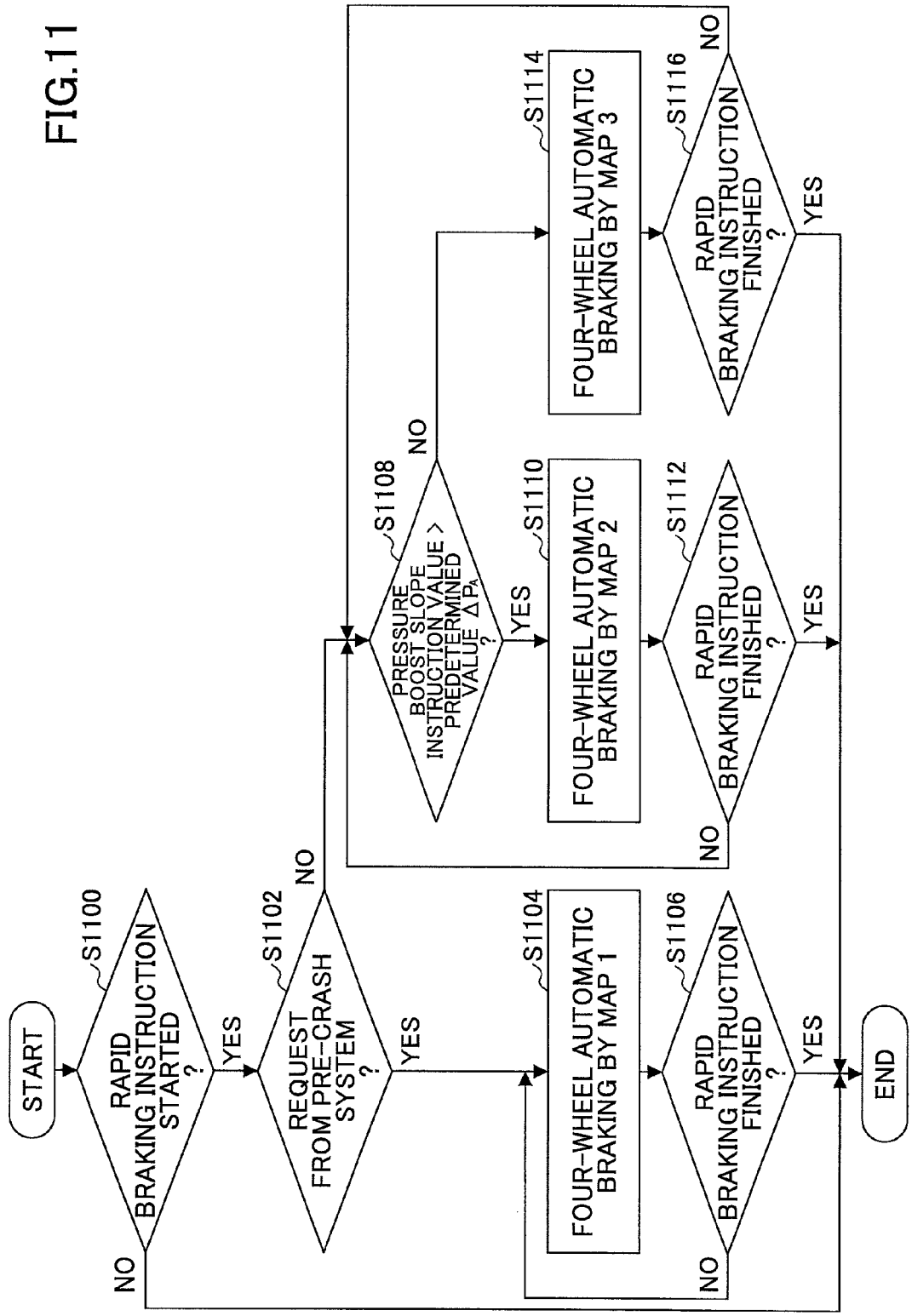
FIG. 11 is a flowchart showing another example of oil pressure control carried out by the control unit 10.

FIG. 11 is a flowchart showing another example of oil pressure control carried out by the control unit 10. It is possible to execute the process routine shown in FIG. 11 repeatedly every predetermined cycle during vehicle running. FIG. 12 shows example of respective maps 1, 2 and 3 used in the process of FIG. 11.

In step 1100, the control unit 10 determines a rapid braking instruction start condition. The rapid braking instruction start condition can be one satisfied when predetermined emergency deceleration is required. In the example, the rapid braking instruction start condition is satisfied when a request is sent by a pre-crash system that carries out control to avoid a collision with a front obstacle. For example, in the pre-crash system, when it is determined that a collision with an obstacle is unavoidable, emergency deceleration is required. Note that the control unit 10 can include a control unit of the pre-crash system. Further, in the example, the rapid braking instruction start condition is satisfied also when a request is sent from a system (a system carrying out automatic driving control such as preceding vehicle following control, automatic cruise control or the like) other than the pre-crash system. For example, in a system carrying out automatic driving control such as preceding vehicle following control or automatic cruise control, emergency deceleration is required when the magnitude of target deceleration exceeds a predetermined value. Note that the control unit 10 can include a control unit of the system carrying out automatic driving control such as preceding vehicle following control or automatic cruise control. When the rapid braking instruction start condition is satisfied, the control unit 10 proceeds to step 1102. Otherwise, the control unit 10 finishes the process.

In step 1102, the control unit 10 determines whether the emergency deceleration request is one from the pre-crash system. When the emergency deceleration request is one from the pre-crash system, the control unit 10 proceeds to step 1104. When the emergency deceleration request is one from another system, the control unit 10 proceeds to step 1108.

In step 1104, the control unit 10 carries out four-wheel automatic braking (non-inhibiting-type four-wheel automatic braking) not inhibiting a pressure boost by the rear-wheel-system oil-hydraulic circuit 201R based on a map 1 (see FIG. 12). Specifically, the control unit 10 operates the pumps 260F and 260R, and also, calculates a pressure boost slope instruction amount to be common to the front-wheel-system oil-hydraulic circuit 201F and the rear-wheel-system oil-hydraulic circuit 201R. That is, the control unit 10 calculates a pressure boost slope instruction amount common to the M/C cut valve 206F of the front-wheel-system oil-hydraulic circuit 201F and the M/C cut valve 206R of the rear-wheel-system oil-hydraulic circuit 201R. The pressure boost slope instruction amount can be calculated in such a manner as to gradually increase with time toward a final pressure boost slope instruction amount. The final pressure boost slope instruction amount can be a fixed value, or a variable value that is set depending on a relationship (TTC or the like) with respect to a front obstacle. Then, the control unit 10 calculates a differential pressure instruction value corresponding to the calculated pressure boost slope instruction amount based on the map 1 and applies the differential pressure instruction value (electric current) to the M/C cut valves 206F and 206R, respectively. Here, according to the map 1, the differential pressure instruction value with respect to the pressure boost slope instruction amount is the same for the M/C cut valve 206F of the front-wheel-system oil-hydraulic circuit 201F and the M/C cut valve 206R of the rear-wheel-system oil-hydraulic circuit 201R. Specifically, for the M/C cut valve 206F of the front-wheel-system oil-hydraulic circuit 201F, when the pressure boost slope instruction amount exceeds a predetermined value $\Delta P_A$, the differential pressure instruction value increases at a predetermined slope G1 toward a predetermined value S1 (an upper limit or a value approximately near the upper limit). Also for the M/C cut valve 206R of the rear-wheel-system oil-hydraulic circuit 201R, when the pressure boost slope instruction amount exceeds the predetermined value $\Delta P_A$, the differential pressure instruction value increases at the predetermined slope G1 toward the predetermined value S1 (the upper limit or the value approximately near the upper limit). Thereby, ensuring deceleration is given priority over vehicle stability, and it is possible to achieve the maximum deceleration corresponding to the most emergency situation such as collision unavoidable.

In step 1106, the control unit 10 determines a rapid braking instruction finish condition. It is possible that the rapid braking instruction finish condition is satisfied, for example, when a collision is detected, when the vehicle body speed becomes 0 km/h, when the TTC exceeds 1.5 [seconds] or when the rapid braking instruction continues for a predetermined time (for example, 3 seconds) or more. When the rapid braking instruction finish condition is satisfied, the control unit 10 finishes the process. Otherwise, the control unit 10 returns to step 1104.

In step 1108, the control unit 10 calculates the pressure boost slope instruction amount to be common to the rear-wheel-system oil-hydraulic circuit 201R and the front-wheel-system oil-hydraulic circuit 201F and determines whether the pressure boost slope instruction amount is greater than the predetermined value $\Delta P_A$. When the pressure boost slope instruction amount is greater than the predetermined value $\Delta P_A$, the control unit 10 proceeds to step 1110. When the pressure boost slope instruction amount is less than the predetermined value $\Delta P_A$, the control unit 10 proceeds to step 1114. Note that it is possible that the determination as to whether the pressure boost slope instruction amount is greater than the predetermined value $\Delta P_A$ is carried out only for the initially calculated pressure boost slope instruction amount. In this case, it is possible that at the subsequent cycle and thereafter, the control unit 10 proceeds to step 1110 or 1114 according to the determination result for the initially calculated pressure boost slope instruction amount.

In step 1110, the control unit 10 carries out four-wheel automatic braking (rear-wheel pressure-boost-inhibiting-type four-wheel automatic braking) inhibiting a pressure boost by the rear-wheel-system oil-hydraulic circuit 201R based on the map 2 (see FIG. 12). Specifically, the control unit 10 operates the pumps 260F and 260R. Then, the control unit 10 calculates differential pressure instruction values corresponding to calculated pressure boost slope instruction amounts, respectively, based on the map 2, and applies the differential pressure instruction values (electric currents) to the M/C cut valves 206F and 206R, respectively. Here, according to the map 2, differential pressure instruction values for pressure boost slope instruction amounts are different for the M/C cut valve 206F of the front-wheel-system oil-hydraulic circuit 201F and the M/C cut valve 206R of the rear-wheel-system oil-hydraulic circuit 201R. Specifically, for the M/C cut valve 206F of the front-wheel-system oil-hydraulic circuit 201F, when a pressure boost slope instruction amount exceeds a predetermined value $\Delta P_A$, a differential pressure instruction value increases at a predetermined slope G1 toward a predetermined value S1. In contrast thereto, for the M/C cut valve 206R of the rear-wheel-system oil-hydraulic circuit 201R, when a pressure boost slope instruction amount exceeds the predetermined value $\Delta P_A$, a differential pressure instruction value increases at a predetermined slope G2 (<G1) toward a predetermined value S2 (<S1). That is, when a pressure boost slope instruction amount increases, a differential pressure instruction value for the M/C cut valve 206R of the rear-wheel-system oil-hydraulic circuit 201R increases at the slope gentler than a differential pressure instruction value for the M/C cut valve 206F of the front-wheel-system oil-hydraulic circuit 201F toward the predetermined value S2. Therefore, when the pressure boost slope instruction amount is calculated to be common to the M/C cut valve 206R of the rear-wheel-system oil-hydraulic circuit 201R and the M/C cut valve 206F of the front-wheel-system oil-hydraulic circuit 201F in a manner of increasing with time, the differential pressure instruction value for the M/C cut valve 206R has such an increase way as to have the increased slope less than an increase way of the differential pressure instruction value of the M/C cut valve 206F. Thereby, it is possible to obtain the same advantageous effect as the case described with reference to FIG. 10.

Here, there is a tendency such that at a time of an emergency deceleration request from a system carrying out automatic driving control such as preceding vehicle following control or automatic cruise control, a pressure boost slope instruction amount (target deceleration) is smaller than a time of an emergency deceleration request from a pre-crash system. That is, at a time of an emergency deceleration request from a system carrying out automatic driving control such as preceding vehicle following control or automatic cruise control, the necessity of carrying out a pressure boost of the wheel cylinder pressures of the wheel cylinders 224RL and 224RR for the rear wheels up to approximately an upper limit can be reduced in contrast to a time of an emergency deceleration request from a pre-crash system. In consideration of this point, according to the map 2, the predetermined value S2 of the differential pressure instruction value for the M/C cut valve 206R is smaller than the predetermined value S1 of the differential pressure instruction value for the M/C cut valve 206F. Therefore, it is possible to prevent the wheel cylinder pressure at the rear wheel side from being increased to be the same as or similar to the wheel cylinder pressure at the front wheel side and it is possible to improve vehicle stability.

In step 1112, the control unit 10 determines a rapid braking instruction finish condition. It is possible that the rapid braking instruction finish condition is satisfied, for example, when an inter-vehicle distance necessary with respect to a leading vehicle is kept or when the rapid braking instruction continues for a predetermined time (for example, 3 seconds) or more. When the rapid braking instruction finish condition is satisfied, the control unit 10 finishes the process. Otherwise, the control unit 10 returns to step 1108.

In step 1114, the control unit 10 carries out four-wheel automatic braking not inhibiting a pressure boost by the rear-wheel-system oil-hydraulic circuit 201R based on the map 3 (see FIG. 12). This four-wheel automatic braking is the same as the four-wheel automatic braking in the above-mentioned step 1104 in the point of not inhibiting a pressure boost by the rear-wheel-system oil-hydraulic circuit 201R. However, this four-wheel automatic braking is greatly different from the four-wheel automatic braking in the above-mentioned step 1104 in the point of implementing gentle braking with low emergency. Specifically, the control unit 10 operates the pumps 260F and 260R. Then, the control unit 10 calculates a differential pressure instruction value corresponding to a calculated pressure boost slope instruction amount based on the map 3, and applies the differential pressure instruction value (electric current) to the M/C cut valves 206F and 206R. Here, according to the map 3, the differential pressure instruction value for the pressure boost slope instruction amount is the same for the M/C cut valve 206F of the front-wheel-system oil-hydraulic circuit 201F and the M/C cut valve 206R of the rear-wheel-system oil-hydraulic circuit 201R. Specifically, for the M/C cut valve 206F of the front-wheel-system oil-hydraulic circuit 201F and the M/C cut valve 206R of the rear-wheel-system oil-hydraulic circuit 201R, the differential pressure instruction value increases at a gentle predetermined slope G3 (<G2) toward a predetermined value S3 (<S2) until the pressure boost slope instruction amount reaches a predetermined value $\Delta P_T$.

In step 1116, the control unit 10 determines a rapid braking instruction finish condition. It is possible that the rapid braking instruction finish condition is satisfied, for example, when a necessary inter-vehicle distance with respect to a leading vehicle is kept or when the rapid braking instruction continues for a predetermined time (for example, 2 seconds) or more. When the rapid braking instruction finish condition is satisfied, the control unit 10 finishes the process. Otherwise, the control unit 10 returns to step 1108.

Thus, according to the control method shown in FIG. 11, even when a rapid braking instruction is generated by which a pressure boost slope instruction amount increases, it is possible to prevent the wheel cylinder pressure of the wheel cylinders 224RL and 224RR for the rear wheels from exceeding the wheel cylinder pressure of the wheel cylinders 224FL and 224FR for the front wheels, it is possible to avoid a rear wheel locking tendency, and it is possible to improve vehicle stability. Further, by using the respective different maps (FIG. 12) for emergency deceleration from a pre-crash system and emergency deceleration from another system, respectively, it is possible to implement rapid braking depending on characteristics of the respective systems while keeping vehicle stability.

Note that such a system can be considered where even in a pre-crash system, the level of collision unavoidable is evaluated in a multistage manner. In this case, such a configuration can be provided as to use the map 1 when the level of a likelihood of a collision is highest while using the map 2 when the level of a likelihood of a collision is relatively low.

Figure 13:
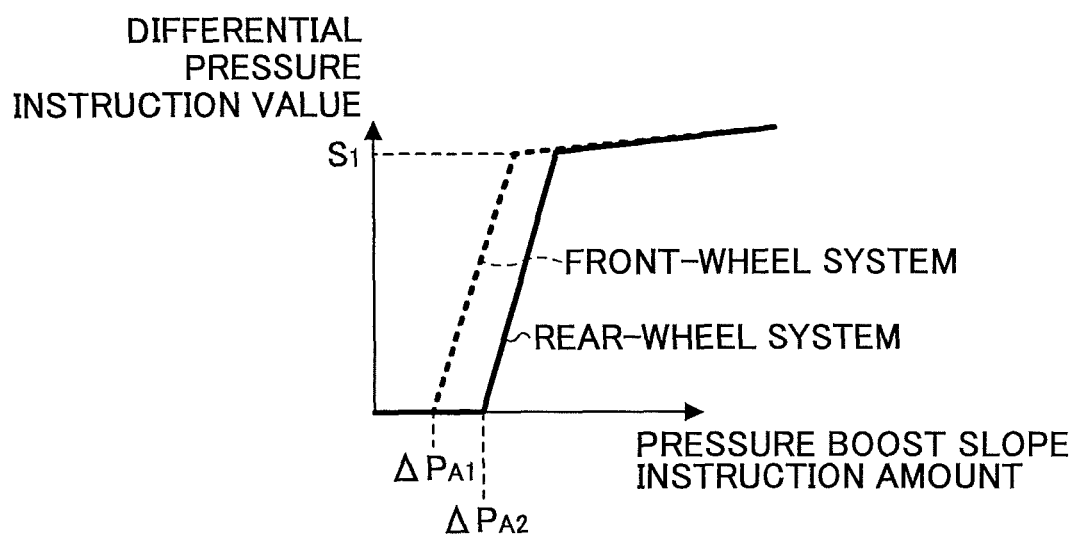
FIG. 13 shows another example of the map 2.

FIG. 13 shows another example of the map 2 usable in step 1110 in FIG. 11. According to the map 2 shown in FIG. 13, a differential pressure instruction value for a pressure boost slope instruction amount is different for the M/C cut valve 206F of the front-wheel-system oil-hydraulic circuit 201F and the M/C cut valve 206R of the rear-wheel-system oil-hydraulic circuit 201R, respectively. Specifically, for the M/C cut valve 206F of the front-wheel-system oil-hydraulic circuit 201F, when a pressure boost slope instruction amount exceeds a first predetermined value $\Delta P_{A1}$, a differential pressure instruction value increases at a predetermined slope G1 toward a predetermined value S1 (an upper limit or a value approximately near the upper limit). In contrast thereto, for the M/C cut valve 206R of the rear-wheel-system oil-hydraulic circuit 201R, until a pressure boost slope instruction amount exceeds a second predetermined value $\Delta P_{A2}$ ($>\Delta P_{A1}$), a differential pressure instruction value does not increase. Note that, for the M/C cut valve 206R of the rear-wheel-system oil-hydraulic circuit 201R, when the pressure boost slope instruction amount exceeds the second predetermined value $\Delta P_{A2}$, the differential pressure instruction value increases at the same slope G1 toward the same predetermined value S1. Therefore, when the pressure boost slope instruction amount common to the M/C cut valve 206R of the rear-wheel-system oil-hydraulic circuit 201R and the M/C cut valve 206F of the front-wheel-system oil-hydraulic circuit 201F is calculated in a manner of increasing with time, an increase way of the differential pressure instruction value for the M/C cut valve 206R has a time delay with respect to an increase way of the differential pressure instruction value for the M/C cut valve 206F. Thereby, it is possible to obtain the same advantageous effect as a case of setting a predetermined delay time $\Delta T$ such as that described above with reference to FIG. 6. Note that the difference between the first predetermined value $\Delta P_{A1}$ and the second predetermined value $\Delta P_{A2}$ can be set by the same solution as the case of setting the predetermined delay time $\Delta T$.

Thus, the preferable embodiment has been described in detail. However, the present invention is not limited to the above-described embodiment, and it is possible to make various modifications and replacements to the above-described embodiment without departing from the scope of the invention.

For example, according to the above-described embodiment, at a time of non-inhibiting-type four-wheel automatic braking, the front wheel system and the rear wheel system are increased in their pressures in the same characteristics. However, they are not necessarily the completely the same. That is, in the above-described embodiment, at a time of non-inhibiting-type four-wheel automatic braking, inhibition of a pressure boost by the rear-wheel-system oil-hydraulic circuit 201R is completely removed. However, it is not necessary to completely remove inhibition. What is needed is that at a time of non-inhibiting-type four-wheel automatic braking, the degree of inhibition is lower than a time of rear-wheel pressure-boost-inhibiting-type four-wheel automatic braking.

Further, in the above-described embodiment, the configuration is assumed not to include wheel cylinder pressure sensors for the wheel cylinders 224FR, 224FL, 224RR and 224RL. Even in such an inexpensive configuration, it is possible to improve vehicle stability at a time of rear-wheel pressure-boost-inhibiting-type four-wheel automatic braking through feed forward control as described above instead of using feedback control based on the detection values of wheel cylinder pressure sensors. However, it is also possible to set target control values through feedback based on the output signals of the wheel speed sensors 138FR, 138FL, 138RR and 138RL. Note that the present invention can also be applied to a configuration having wheel cylinder pressure sensors. In this case, it is possible to use the detection values of the wheel cylinder pressure sensors for feedback control at a time of rear-wheel pressure-boost-inhibiting-type four-wheel automatic braking, and it is also possible not to use the detection values of the wheel cylinder pressure sensors for feedback control at a time of rear-wheel pressure-boost-inhibiting-type four-wheel automatic braking.

Further, in the above-described embodiment, a configuration is assumed not to include accumulators to store high-pressure oil discharged by the pumps 260F and 260R. In such an inexpensive configuration, the pressure difference between the systems is particularly problematic because it is not possible to supply large amounts of high-pressure oil from accumulators within a short time. Therefore, the above-described embodiment is especially advantageous in a case where the pumps 260F and 260R do not have accumulators. However, the present invention is also applicable to a configuration having accumulators.

Further, in the above-described embodiment, the pumps 260F and 260R are provided for the respective systems. However, it is also possible to provide a single pump common to the two systems. For example, it is possible that, in the oil-hydraulic circuit 200, the reservoirs 250F and 250R are integrated into a single one, also the pumps 260F and 260R are replaced by a single common pump, the discharge end of the single common pump is branched and pump passages 210F and 210R are formed. In this case, a "first oil pressure generation source" and a "second oil pressure generation source" claimed can be implemented by the single common pump. Further, also in this case, the single common pump can have an accumulator.

Further, the oil-hydraulic circuit 200 using front-rear piping shown in the drawing is merely one example, and can be changed in various manners. For example, in the oil-hydraulic circuit 200, it is possible that, by providing suction solenoid valves in the flow passages 205F and 205R, a configuration is provided to turn on and off flows of oil pressures from the master cylinder 202 to the pumps 260F and 260R. Further, it is also possible to provide two check valves on the suction side of each of the pumps 260F and 260R in the pump passages 210F and 210R from the reservoirs 250F and 250R, respectively, and connect the respective one of the flow passages 205F and 205R between the two check valves. In this case, the pumps 260F and 260R suction oil from the master cylinder 202 and discharge the same without using the reservoirs 250F and 250R. Further, the retaining solenoid valves 212FL, 212FR, 212RL and 212RR and the pressure-reduction solenoid valves 214FL, 214FR, 214RL and 214RR can be linear valves. Further, such a configuration can be provided that a common reservoir is used by the master cylinder 202 and the pumps 260F and 260R.

Further, in the above-described embodiment, at a time of rear-wheel pressure-boost-inhibiting-type four-wheel automatic braking, the M/C cut valves 206F and 206R are controlled in mutually different manners and the wheel cylinder pressures of the wheel cylinders 224FL and 224FR for the front wheels and the wheel cylinder pressures of the wheel cylinders 224RL and 224RR for the rear wheels are increased. However, it is also possible to achieve the same pressure increase characteristics as a result of, at a time of rear-wheel pressure-boost-inhibiting-type four-wheel automatic braking, the pumps 260F and 260R being controlled in mutually different manners. In this case, the pumps 260F and 260R are driven by different motors, respectively, and the M/C cut valves 206F and 206R can be turning on/off valves. More specifically, such a configuration can be provided that, at a time of rear-wheel pressure-boost-inhibiting-type four-wheel automatic braking, the M/C cut valves 206F and 206R are closed, and also, the pump 260F and the pump 260R are controlled in mutually different manners. That is, such a configuration can be provided that, the number of rotations (accordingly, the discharge amount) of the pump 260F and the number of rotations (accordingly, the discharge amount) of the pump 260R are controlled in mutually different manners. Thus, in the same way as the above-described embodiment, pressure increases in the wheel cylinders 224FL, 224FR, 224RL and 224RR can be achieved. Note that at a time of non-inhibiting-type four-wheel automatic braking, the pumps 260F and 260R can be controlled in the same manner (the maximum discharge amounts).

Further, in the above-described embodiment, at a time of rear-wheel pressure-boost-inhibiting-type four-wheel automatic braking, the M/C cut valves 206F and 206R are controlled in mutually different manners and the wheel cylinder pressures of the wheel cylinders 224FL and 224FR for the front wheels and the wheel cylinder pressures of the wheel cylinders 224RL and 224RR for the rear wheels are increased. However, it is also possible that, at a time of rear-wheel pressure-boost-inhibiting-type four-wheel automatic braking, the retaining solenoid valves 212FL and 212FR and the pressure-reduction solenoid valves 214FL and 214FR concerning the front-wheel-system oil-hydraulic circuit 201F and the retaining solenoid valves 212RL and 212RR and the pressure-reduction solenoid valves 214RL and 214RR concerning the rear-wheel-system oil-hydraulic circuit 201R are controlled in mutually different manners and the same pressure increase characteristics are achieved. In this case, the M/C cut valves 206F and 206R can be turning on/off valves. In more detail, such a configuration can be provided to achieve pressure increases in the wheel cylinders 224FL, 224FR, 224RL and 224RR in the same way as the above-described embodiment as a result of, at a time of rear-wheel pressure-boost-inhibiting-type four-wheel automatic braking, the M/C cut valves 206F and 206R being closed, and also, the retaining solenoid valves 212FL and 212FR and the pressure-reduction solenoid valves 214FL and 214FR concerning the front-wheel-system oil-hydraulic circuit 201F and the retaining solenoid valves 212RL and 212RR and the pressure-reduction solenoid valves 214RL and 214RR concerning the rear-wheel-system oil-hydraulic circuit 201R being controlled in mutually different manners. However, in this case, the retaining solenoid valves 212FL and 212FR concerning the front-wheel-system oil-hydraulic circuit 201F are controlled in the mutually same manner and the pressure-reduction solenoid valves 214FL and 214FR concerning the front-wheel-system oil-hydraulic circuit 201F are controlled in the mutually same manner. In the same way, the retaining solenoid valves 212RL and 212RR concerning the rear-wheel-system oil-hydraulic circuit 201R are controlled in the mutually same manner and the pressure-reduction solenoid valves 214RL and 214RR concerning the rear-wheel-system oil-hydraulic circuit 201R are controlled in the mutually same manner.

Further, a circuit configuration typically used in a brake-by-wire system represented by an ECB (Electric Control Braking system) can be employed. For example, a circuit configuration such as that disclosed by Japanese Laid-Open Patent Application No. 2006-103547 (however, a pressure-reduction cut valve 90 can be omitted) can be employed. Also in this case, a "first oil pressure generation source" and a "second oil pressure generation source" claimed can be implemented by the single common pump. Further, in this case, the M/C cut valves can be turning on/off valves. When such a circuit configuration is employed, at a time of rear-wheel pressure-boost-inhibiting-type four-wheel automatic braking, it is possible that, in the same way, the M/C cut valves are closed and also the retaining solenoid valves and the pressure-reduction solenoid valves are controlled in mutually different manners for the respective systems and pressure increases in the respective wheel cylinders are achieved in the same manner as the above-described embodiment. However, also in this case, in the same manner, within each system, the retaining solenoid valves and the pressure-reduction solenoid valves are controlled in the same manner. On the other hand, at a time of non-inhibiting-type four-wheel automatic braking, it is possible that the M/C cut valves are closed, also that the retaining solenoid valves and the pressure-reduction solenoid valves are controlled in the same manner between the systems and thereby ensuring deceleration is given priority.

Further, in the above-described embodiment, the front radar sensor 134 is used to detect a front obstacle. However, it is also possible to use a camera instead thereof or in addition thereto. For example, a front obstacle can be detected by the front radar sensor 134 and the camera in a cooperative manner.

Further, in the above-described embodiment, when it is determined that a collision is unavoidable, non-inhibiting-type four-wheel automatic braking is carried out at any time. However, another condition can be added concerning carrying out non-inhibiting-type four-wheel automatic braking. For example, such a configuration can be provided that non-inhibiting-type four-wheel automatic braking is carried out when it is determined that a collision is unavoidable and also when a likelihood of spinning is low (for example, the steering wheel (steering angle) is kept in a going straight direction). On the other hand, such a configuration can be provided that rear-wheel pressure-boost-inhibiting-type four-wheel automatic braking is carried out when a likelihood of spinning is high even when it is determined that a collision is unavoidable.

DESCRIPTION OF REFERENCE NUMERALS 1 vehicle braking apparatus
10 control unit
100FL left front wheel
100FR right front wheel
100RL left rear wheel
100RR right rear wheel
134 front radar sensor
136 acceleration sensor
138FL, FR, RL, RR wheel speed sensors
190 brake pedal
200 oil-hydraulic circuit
201F front-wheel-system oil-hydraulic circuit
201R rear-wheel-system oil-hydraulic circuit
202 master cylinder
204F, R master passages
205F, R flow passages
206F, R M/C cut valves
208F, R high-pressure flow passages
210F, R pump passages
212F, R retaining solenoid valves
214F, R pressure-reduction solenoid valves
216F, R pressure-reduction passages
224FL, FR, RL, RR wheel cylinders
250F, R reservoirs
260F, R pumps
262F, R check valves
265 master-cylinder pressure sensor

The invention claimed is:

1. A vehicle braking apparatus which varies a relationship of a pressure increase characteristic of a wheel cylinder pressure of rear-wheels with respect to a pressure increase characteristic of a wheel cylinder pressure of front-wheels depending on a determination result of a likelihood of collision with an obstacle, comprising:
  a control unit including a computer configured to:
  when it is determined that collision with an obstacle is not unavoidable,
    control the relationship of the pressure increase characteristic of the wheel cylinder pressure of the rear-wheels with respect to the pressure increase characteristic of the wheel cylinder pressure of the front-wheels to be a relationship in which the wheel cylinder pressure of the rear wheels increases not earlier than the wheel cylinder pressure of the front wheels, and
    control a pressure increase start timing of the wheel cylinder pressure of the rear wheels to be later than a pressure increase start timing of the wheel cylinder pressure of the front wheels.

2. A vehicle braking apparatus which varies a relationship of a pressure increase characteristic of the wheel cylinder pressure of the rear-wheels with respect to a pressure increase characteristic of the wheel cylinder pressure of the front-wheels depending on a determination result of a likelihood of collision with an obstacle, comprising:
  a control unit including a computer configured to: when it is determined that collision with an obstacle is unavoidable, control the relationship of the pressure increase characteristic of the wheel cylinder pressure of the rear-wheels with respect to the pressure increase characteristic of the wheel cylinder pressure of the front-wheels to be a relationship in which the wheel cylinder pressure of the rear wheels increases earlier than the wheel cylinder pressure of the front wheels.

3. The vehicle braking apparatus as claimed in claim 2, wherein the control further configured to, when it is determined that collision with an obstacle is unavoidable, control a pressure increase start timing of the wheel cylinder pressure of the rear wheels to be coincident with a pressure increase start timing of the wheel cylinder pressure of the front wheels.

4. A vehicle braking apparatus comprising:
an oil-hydraulic circuit of a first system that provides oil pressure to a wheel cylinder of front wheels in a vehicle;
an oil-hydraulic circuit of a second system that provides oil pressure to a wheel cylinder of rear wheels in the vehicle;
a first oil-pressure generation source that is provided in the oil-hydraulic circuit of the first system and generates oil pressure which is provided to the wheels cylinder of the front wheels by the oil-hydraulic circuit of the first system;
a first valve that is provided in the oil-hydraulic circuit of the first system and varies the wheel cylinder pressure of the front wheels;
a second oil-pressure generation source that is provided in the oil-hydraulic circuit of the second system and generates oil pressure which is provided to the wheel cylinder of the rear wheels by the oil-hydraulic circuit of the second system;
a second valve that is provided in the oil-hydraulic circuit of the second system and varies the wheel cylinder pressure of the rear wheels;
a third oil-pressure generation part that is connected with the oil-hydraulic circuit of the first system and the oil-hydraulic circuit of the second system and generates oil pressure according to an operation of a brake pedal by a driver; and
a control unit including a computer that is configured to, when predetermined emergency deceleration is required, carry out emergency braking control which does not depend on the operation of the brake pedal by the driver, wherein
in the emergency braking control, when it is determined that collision with an obstacle is not unavoidable,
the control unit controls the first valve and the second valve in mutually different manners or controls the first oil-pressure generation source and the second oil-pressure generation source in mutually different manners so as to prevent the wheel cylinder pressure of the rear wheels from increasing earlier than the wheel cylinder pressure of the front wheels and increases the wheel cylinder pressure of the front wheels and the wheel cylinder pressure of the rear wheels, respectively, by using the oil-hydraulic circuit of the first system and the oil-hydraulic circuit of the second system based on oil pressures generated by the first oil-pressure generation source and the second oil-pressure generation source, wherein
a relationship of a pressure increase characteristic of the rear-wheel brake oil pressure with respect to a pressure increase characteristic of the front-wheel brake oil pressure is caused to be a relationship in which wheel cylinder pressure of the rear wheels increases not earlier than wheel cylinder pressure of the front wheels, and
a pressure increase start timing of the wheel cylinder pressure of the rear wheels is caused to be later than a pressure increase start timing of the wheel cylinder pressure of the front wheels, and
in the emergency braking control, when it is determined that collision with an obstacle is unavoidable,
the control unit controls the first valve and the second valve in the same manner or controls the first oil-pressure generation source and the second oil-pressure generation source in the same manner and increases the wheel cylinder pressure of the front wheels and wheel cylinder pressure of the rear wheels by using the oil-hydraulic circuit of the first system and the oil-hydraulic circuit of the second system based on oil pressures generated by the first oil-pressure generation source and the second oil-pressure generation source.

5. The vehicle braking apparatus as claimed in claim 1, wherein the control unit is further configured to, when it is determined that collision with an obstacle is unavoidable, control the relationship of the pressure increase characteristic of the wheel pressure of the rear-wheels with respect to the pressure increase characteristic of the wheel pressure of the front-wheels to be a relationship in which the wheel cylinder pressure of the rear wheels increases earlier than the wheel cylinder pressure of the front wheels.

6. The vehicle braking apparatus as claimed in claim 5, wherein the control unit is further configured to, when it is determined that collision with an obstacle is unavoidable, control a pressure increase start timing of the wheel cylinder pressure of the rear wheels to be coincident with a pressure increase start timing of the wheel cylinder pressure of the front wheels.

* * * * *

UNITED STATES PATENT AND TRADEMARK OFFICE
CERTIFICATE OF CORRECTION

PATENT NO.          : 9,493,144 B2
APPLICATION NO.     : 14/365320
DATED               : November 15, 2016
INVENTOR(S)         : Yoji Mizoguchi It is certified that error appears in the above-identified patent and that said Letters Patent is hereby corrected as shown below:

On the Title Page

At Assignee item (73), change "TOYOTA JIDOSHA KABUSHIKA KAISHA" to
-- TOYOTA JIDOSHA KABUSHIKI KAISHA --.

Signed and Sealed this
Sixth Day of June, 2017

Michelle K. Lee
*Director of the United States Patent and Trademark Office*